United States Patent [19]

Palombi

[11] Patent Number: 5,029,397
[45] Date of Patent: Jul. 9, 1991

[54] METHOD OF MEASURING A VEHICULAR FRAME TO DETERMINE ALIGNMENT

[75] Inventor: Vern Palombi, Sherwood Park, Canada

[73] Assignee: Global Laser Systems Inc., Alberta, Canada

[21] Appl. No.: 312,719

[22] Filed: Feb. 21, 1989

[51] Int. Cl.[5] .......................... G01C 15/12; G01B 5/24
[52] U.S. Cl. .......................................... 33/288; 33/155;
33/453; 356/154; 364/224
[58] Field of Search .................. 33/286, 288, 608, 453,
33/645, DIG. 21; 356/154, 155; 250/237

[56] References Cited

U.S. PATENT DOCUMENTS

| | | | |
|---|---|---|---|
| 3,322,340 | 5/1967 | Grantland | 33/453 X |
| 4,150,897 | 4/1979 | Roberts, Jr. et al. | 364/155 X |
| 4,242,803 | 1/1981 | Dory | 33/288 |
| 4,381,548 | 4/1983 | Grassman et al. | 33/288 |
| 4,513,508 | 5/1985 | Jarman et al. | 33/288 |
| 4,561,187 | 12/1985 | Powell | 33/288 |
| 4,578,870 | 4/1986 | Cooke | 33/288 |
| 4,630,379 | 12/1986 | Wickmann et al. | 33/288 |

FOREIGN PATENT DOCUMENTS 0049875  9/1981  Fed. Rep. of Germany .
0161216  3/1985  France .

Primary Examiner—Daniel M. Yasich
Attorney, Agent, or Firm—Michael Sand Co.

[57] ABSTRACT

A method of measuring a vehicular frame to determine alignment, where measurements provided in the manufacturer's specifications are known. The method consists of the following steps. Firstly, establishing at least one reference point spaced from a vehicular frame. Secondly, triangulating the vehicular frame by measuring the angle from the reference point to one or more coordinate points provided in the manufacturer's specifications. One side of the triangle containing the reference points is a reference line of a known length. Thirdly, using the length of the reference line and the angular measurement from the reference points as a basis for trigonometric calculation.

18 Claims, 20 Drawing Sheets

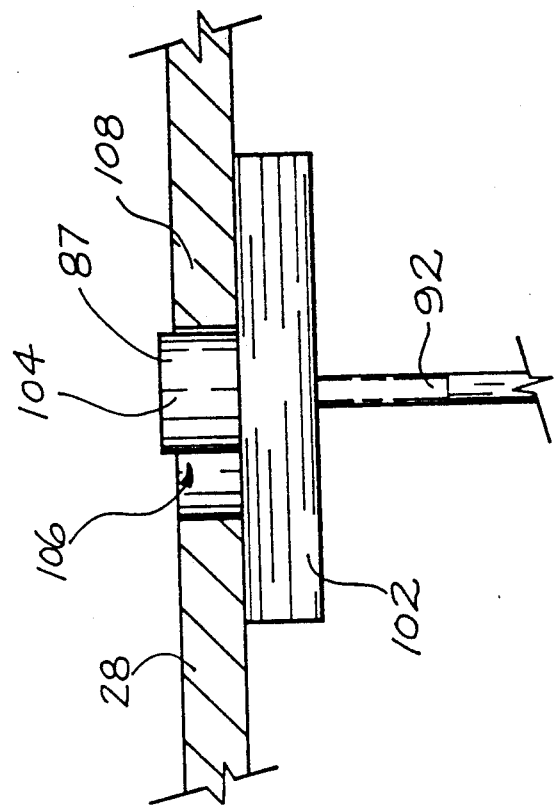
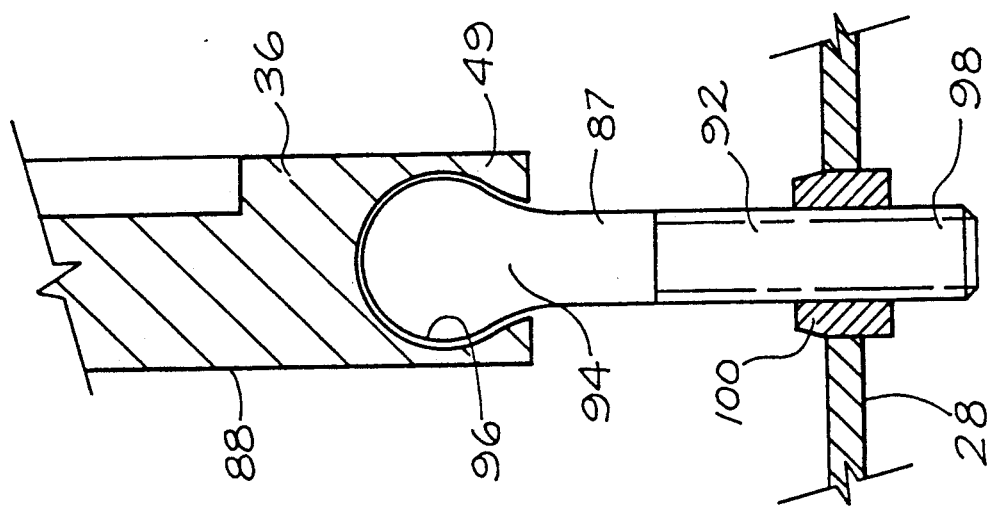

METHOD OF MEASURING A VEHICULAR FRAME TO DETERMINE ALIGNMENT

The present invention relates to a method and apparatus for measuring the alignment of a vehicular frame.

BACKGROUND OF THE INVENTION

When performing repairs to vehicular frames constant measuring is required prior to adjustment and as adjustments are made to determine the extent to which the alignment of the vehicular frame deviates from the manufacturer's specifications. A number of devices are commercially available which perform vehicular frame measurement. These devices have an extremely large and heavy support structure which leads to a number of disadvantages. Being large, the devices present a storage problem for body shops. Being heavy, the devices require more than one person to remove them from storage and ready them for use. Being bulky, the support structure often impinges into the repairman's working area.

SUMMARY OF THE INVENTION

What is required is an alternative method for measuring the alignment of a vehicular frame, and an apparatus for use in accordance with the method which is light, compact and will not impinge into the repairman's working area.

According to one aspect of the present invention there is provided a method of measuring a vehicular frame to determine alignment, where measurements provided in the manufacturer's specifications are known. The method is comprised of the following steps. Firstly, establishing at least one reference point spaced from a vehicular frame. Secondly, triangulating the vehicular frame by measuring the angle from the reference point to one or more coordinate points provided in the manufacturer's specifications. One side of the triangle containing the reference points is a reference line of a known length. Thirdly, using the length of the reference line and the angular measurement from the reference points as a basis for trigonometric calculation.

Although beneficial results may be obtained from use of the described method there is an advantage to dividing up the area of the vehicular frame into right angle, as opposed to isosceles, equilateral, or obtuse scalene triangles in order to facilitate trigonometric calculation. Even more beneficial results may therefore be obtained if a plurality of right angle triangles are formed thereby providing a basis for trigonometric calculation.

Although beneficial results may be obtained from use of the described method the best method of dividing up the area of the vehicular frame into a plurality of right angle triangles is by positioning the reference point on a plane which bisects the vehicular frame longitudinally. Even more beneficial results may therefore be obtained if a single reference point is established at the intersection of a first plane parallel to and spaced from the vehicular frame and a second plane perpendicular to the first plane and equidistant between a majority of pairs of coordinate points on the left side and right side of the vehicle.

Although beneficial results may be obtained from use of the method described coordinate points are at varying heights and the vehicular frame can get in the way of accurate measurement. Even more beneficial results may therefore be obtained if measurements are taken along a datum plane on or parallel to the datum line provided in the manufacturer's specifications.

Although beneficial results may be obtained from use of the described method it is sometimes difficult to locate the intersection of the first plane with the second plane. Even more beneficial results may therefore be obtained if the following steps are followed in establishing the point of intersection. Firstly, selecting a pair of coordinate points which appear to be undamaged, one of the coordinate points being on the left side of the vehicular frame and the other being on the right side of the vehicular frame, the coordinate points being an equal distance from the first plane. Secondly, measuring the angle in relation to a plane perpendicular to the first plane from the proposed reference point to the selected left side coordinate point. Thirdly, measuring the angle in relation to a plane perpendicular to the first plane from the proposed reference point to the selected right side coordinate point. Fourthly, shifting the proposed reference point along the first plane until the angles from the proposed reference point to the selected left side and right side coordinate points are identical.

Although beneficial results may be obtained from the use of the described method, measuring manually can be time consuming. Even more beneficial results may therefore be obtained if a plurality of targets are used. Each of the targets has a first end secured to one of the coordinate points and a second end extending into the datum plane. A laser positioned at the reference point then projects a beam of light along the datum plane such that the beam of light strikes a target.

Although beneficial results may be obtained from the use of the described method, performing the necessary calculations is time consuming. Even more beneficial results may therefore be obtained if a computer is connected to the laser, the computer being programmed to receive and record data regarding the angular adjustment of the laser and to perform trigonometric calculations.

According to another aspect of the invention there is provided a measuring device for use in vehicular repair, which is comprised of a support, a laser rotatably mounted on the support such that the angular positioning of the laser on a horizontal plane may be adjusted. Signal means is provided for measuring the rotation of the laser and converting such motion into an electrical signal. A computer is programmed to receive signals from the signal means, and using data regarding the angular adjustment of the laser and other preprogrammed information, perform trigonometric calculations.

Although beneficial results may be obtained from use of the described apparatus, it is advantageous if movement of the laser can be effected through a remote control device. Even more beneficial results may therefore be obtained if the apparatus has an incremental rotary actuator which converts electrical signal inputs from a control device into rotation of the laser.

Although beneficial results may be obtained from use of the described apparatus, according to the described method the laser must be moved along the first plane until the point of intersection with the second plane is determined. Even more beneficial results may therefore be obtained if the support has a mounting beam with a longitudinal track and the laser has means for engaging the track such that the laser is secured to and movable between the first and second ends of the mounting beam.

BRIEF DESCRIPTION OF THE DRAWINGS

These and other features of the invention will become more apparatus from the following description in which reference is made to the appended drawings, wherein:

FIG. 18 is a detail view of a first portion of the upper body target illustrated in FIG. 14.

FIG. 19 is a detail view of a first portion of the lower body target illustrated in FIG. 16.

DETAILED DESCRIPTION OF THE PREFERRED EMBODIMENT

Figure 1:
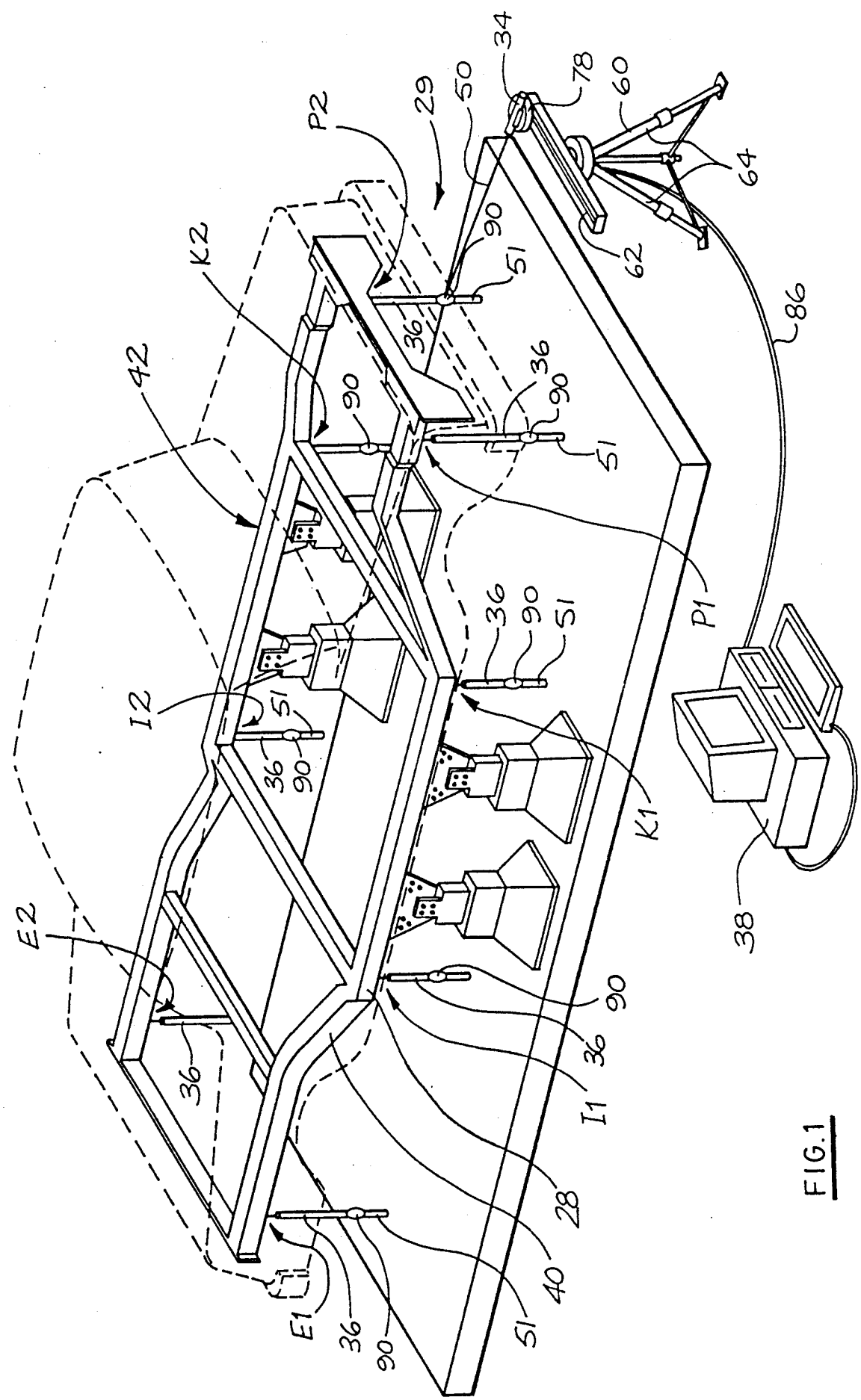
FIG. 1 is a perspective view illustrating the preferred apparatus in a first position being used for alignment of the lower portion of a vehicular body in accordance with the preferred method.
Figure 2:
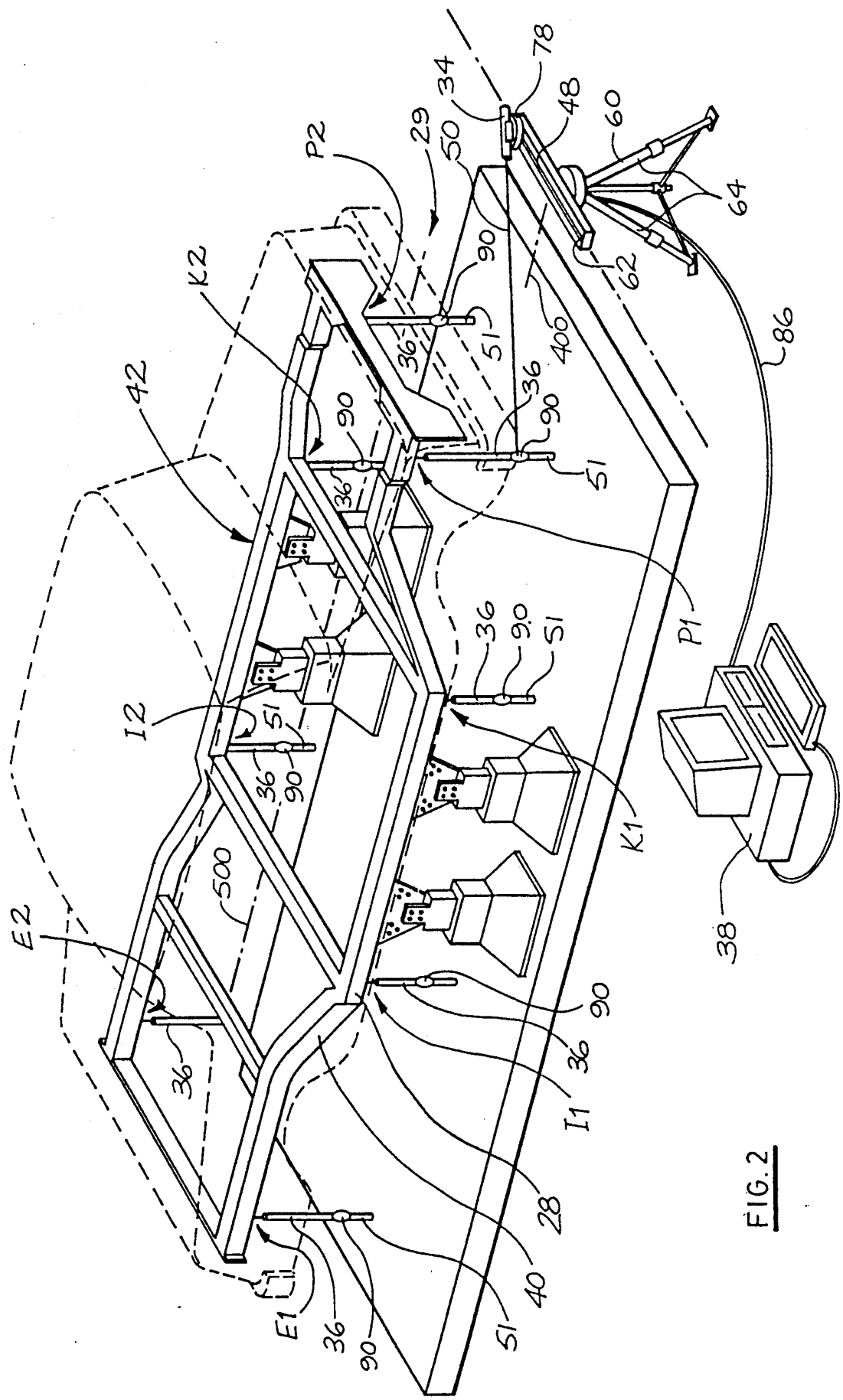
FIG. 2 is a perspective view illustrating the preferred apparatus in a second position being used for alignment of the lower portion of a vehicular body in accordance with the preferred method.
Figure 3:
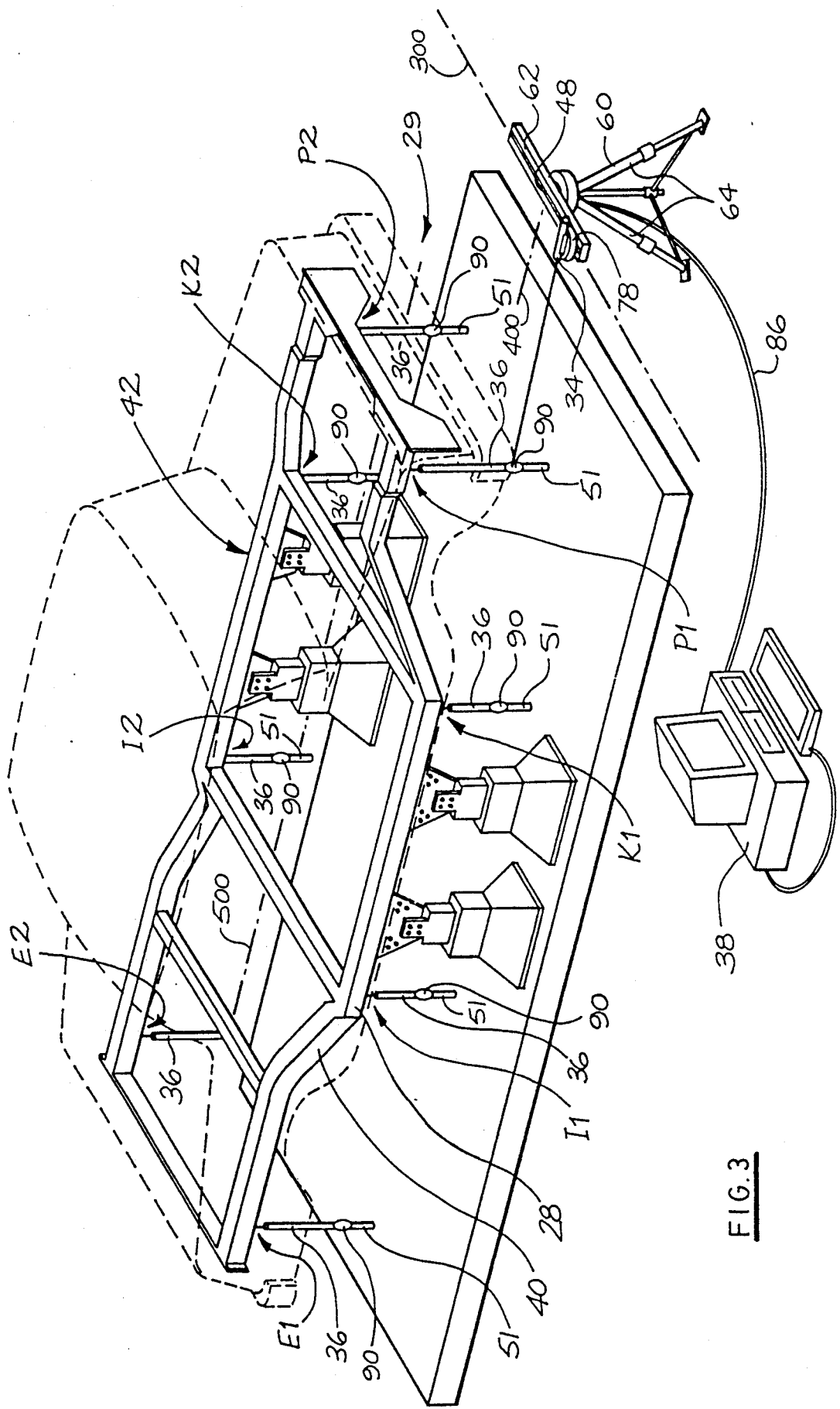
FIG. 3 is a perspective view illustrating the preferred apparatus in a third position being used for alignment of the lower portion of a vehicular body in accordance with the preferred method.
Figure 4:
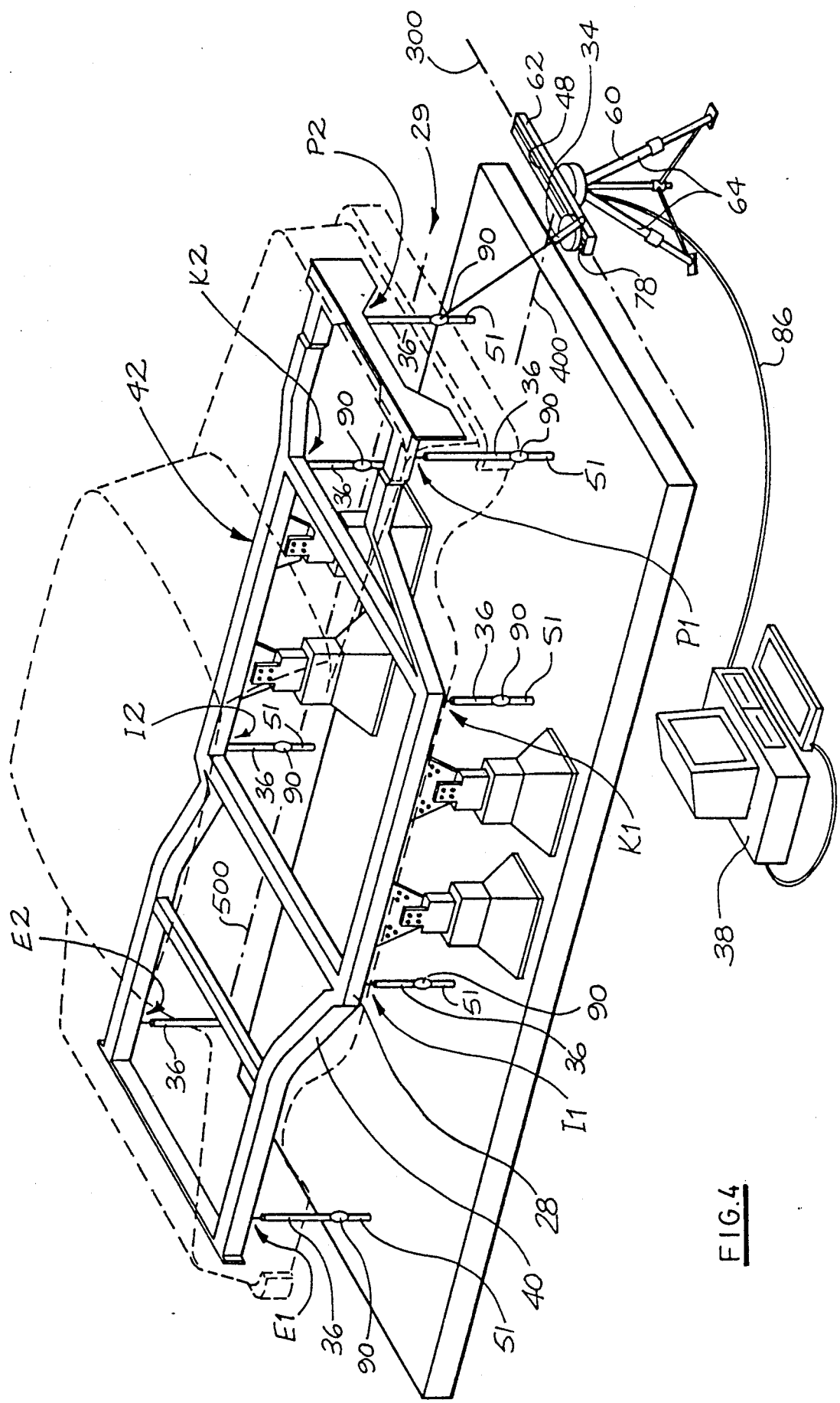
FIG. 4 is a perspective view illustrating the preferred apparatus in a fourth position being used for alignment of the lower portion of a vehicular body in accordance with the preferred method.
Figure 5:
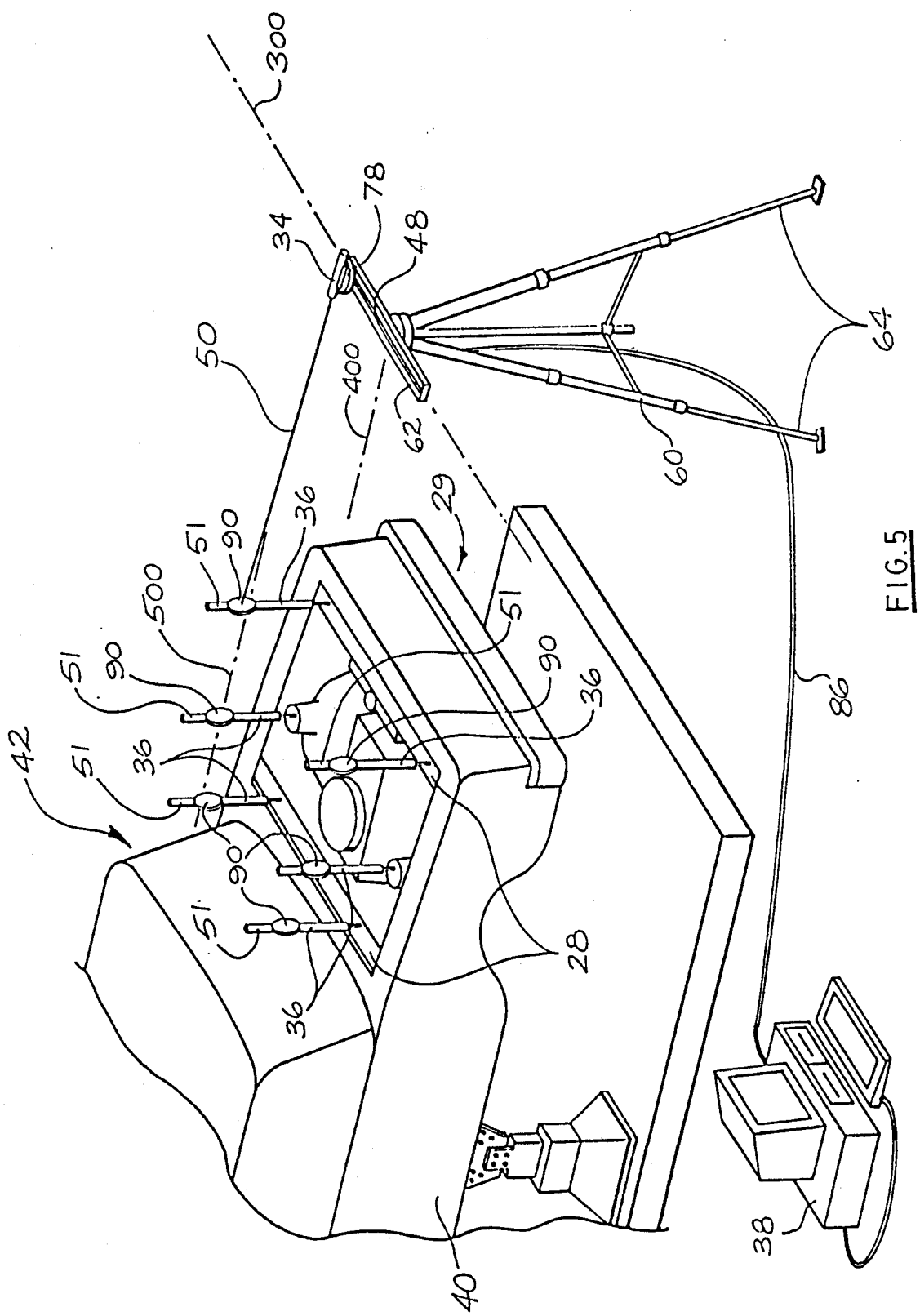
FIG. 5 is a perspective view illustrating the preferred apparatus in a first position being used for alignment of the upper portion of a vehicular body in accordance with the preferred method.
Figure 6:
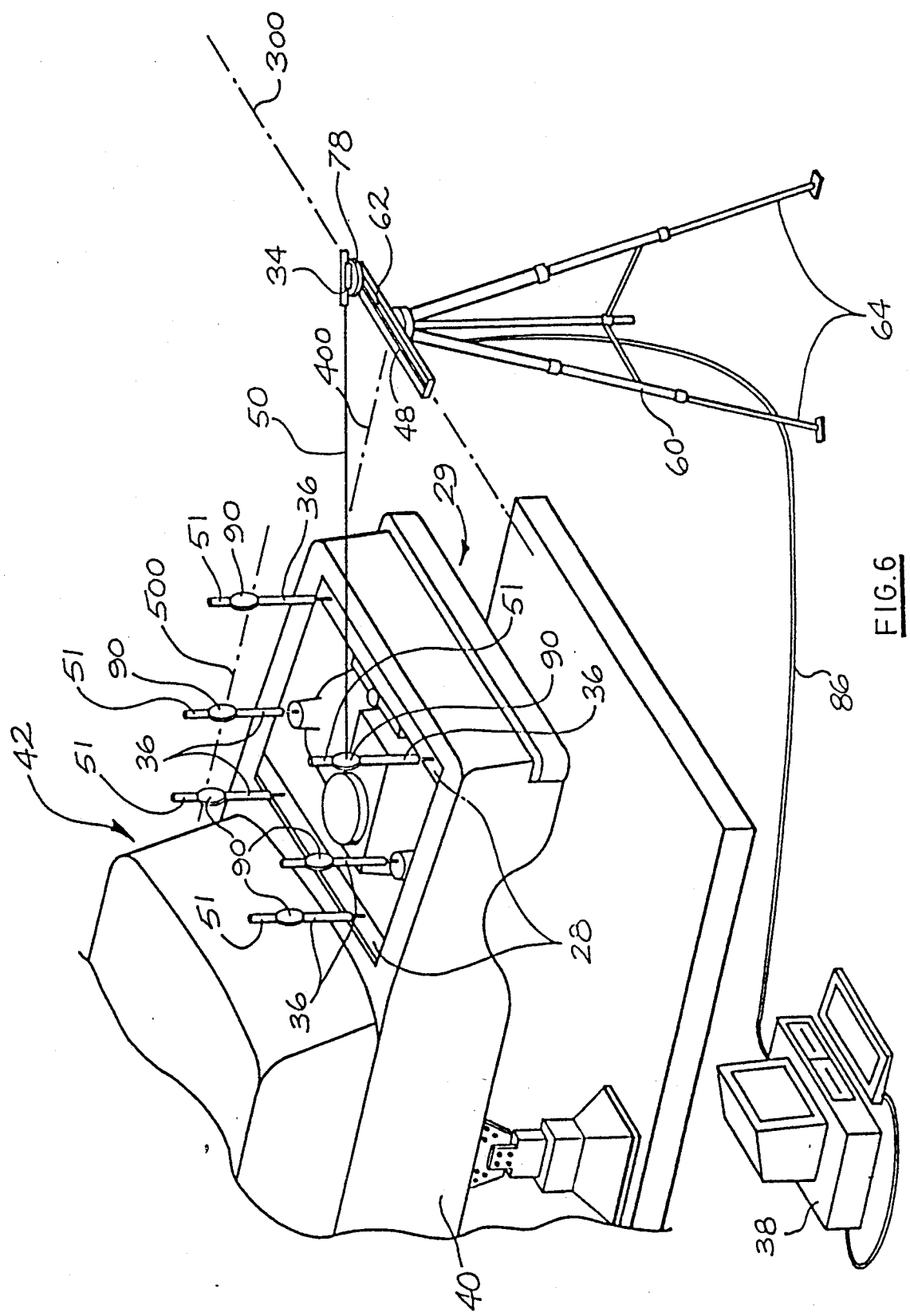
FIG. 6 is a perspective view illustrating the preferred apparatus in a second position being used for alignment of the lower portion of a vehicular body in accordance with the preferred method.
Figure 7:
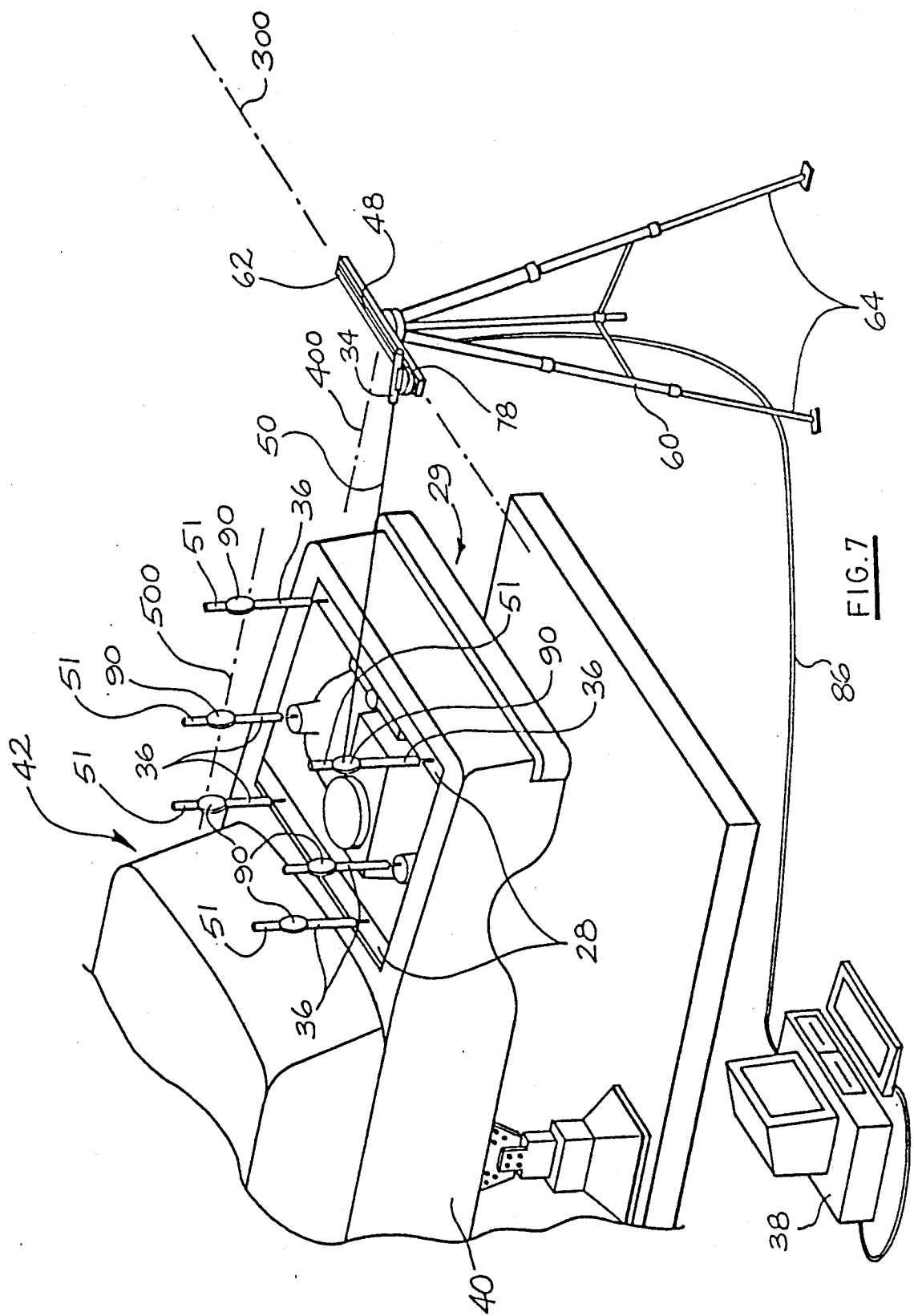
FIG. 7 is a perspective view illustrating the preferred apparatus in a third position being used for alignment of the lower portion of a vehicular body in accordance with the preferred method.
Figure 8:
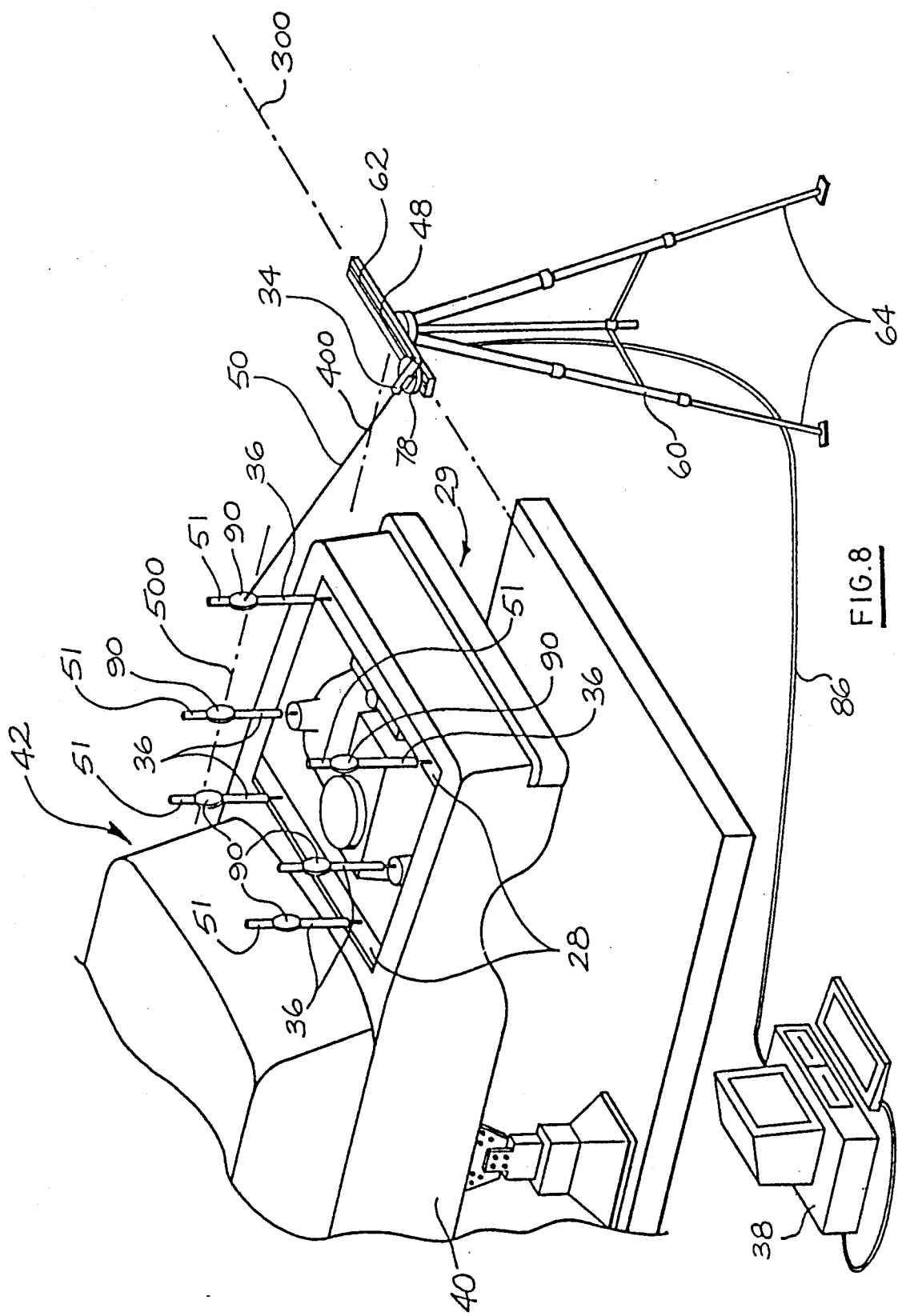
FIG. 8 is a perspective view illustrating the preferred apparatus in a fourth position being used for alignment of the lower portion of a vehicular body in accordance with the preferred method.
Figure 9:
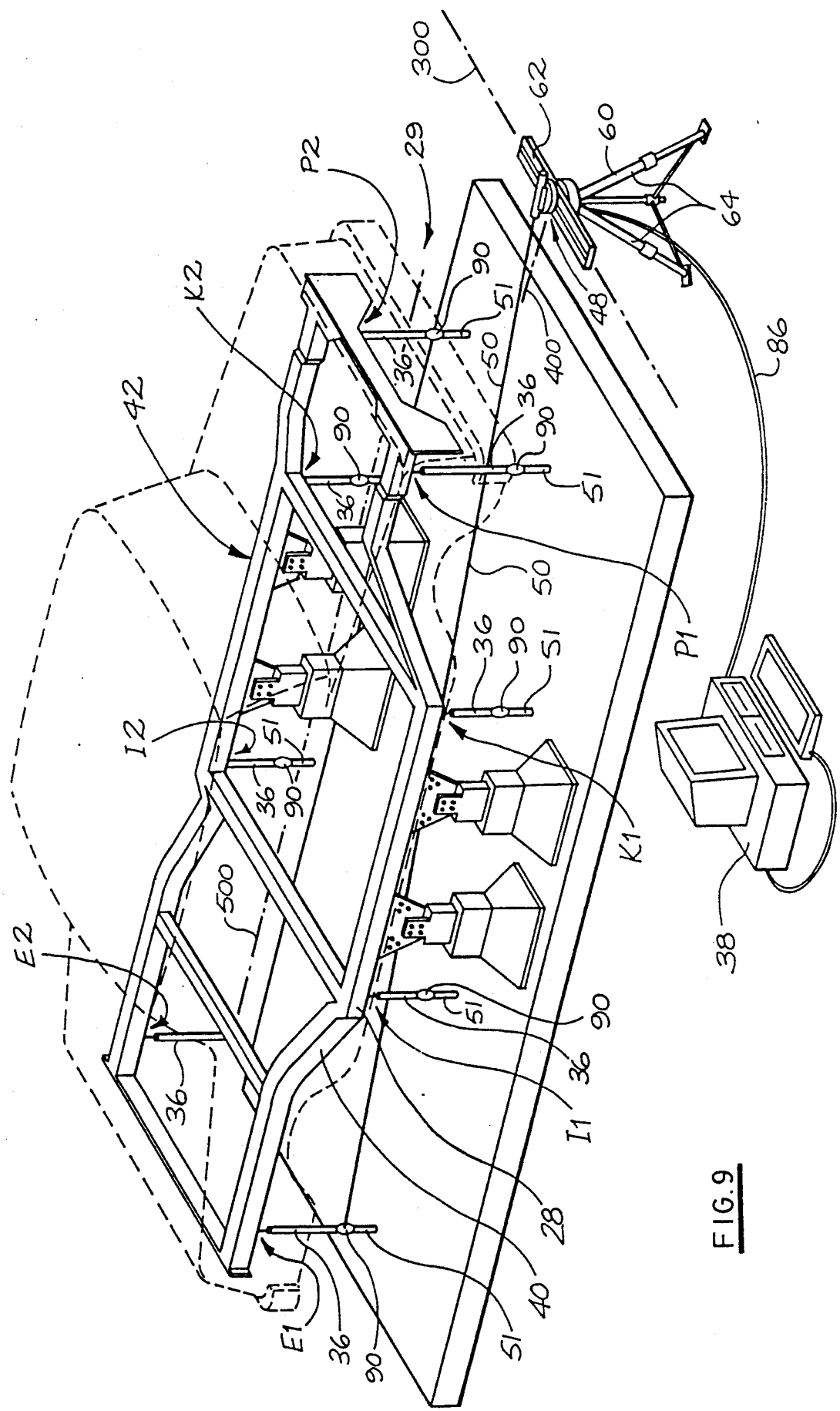
FIG. 9 is a perspective view illustrating the preferred apparatus in a fifth position being used for alignment of the lower portion of a vehicular body in accordance with the preferred method.
Figure 10:
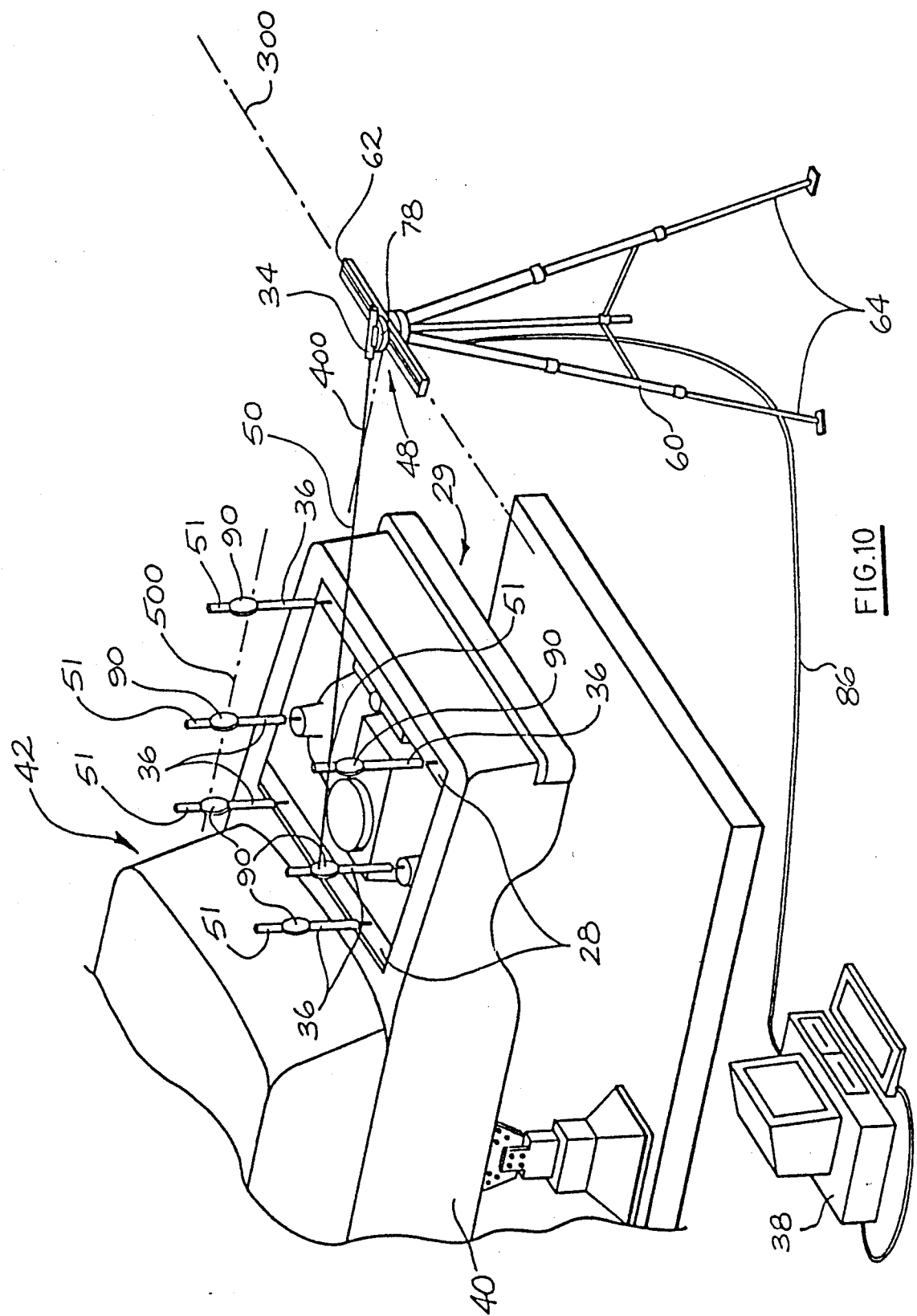
FIG. 10 is a perspective view illustrating the preferred apparatus in a fifth position being used for alignment of the upper portion of a vehicular body in accordance with the preferred method.

The preferred method will now be described with reference to FIGS. 1 through FIG. 25 and 26. The preferred embodiment of the invention will now be described with reference to FIGS. 1 through 25. The preferred embodiment, generally designated by reference numeral 200, is a measuring device for use in vehicular repair.

Figure 26:
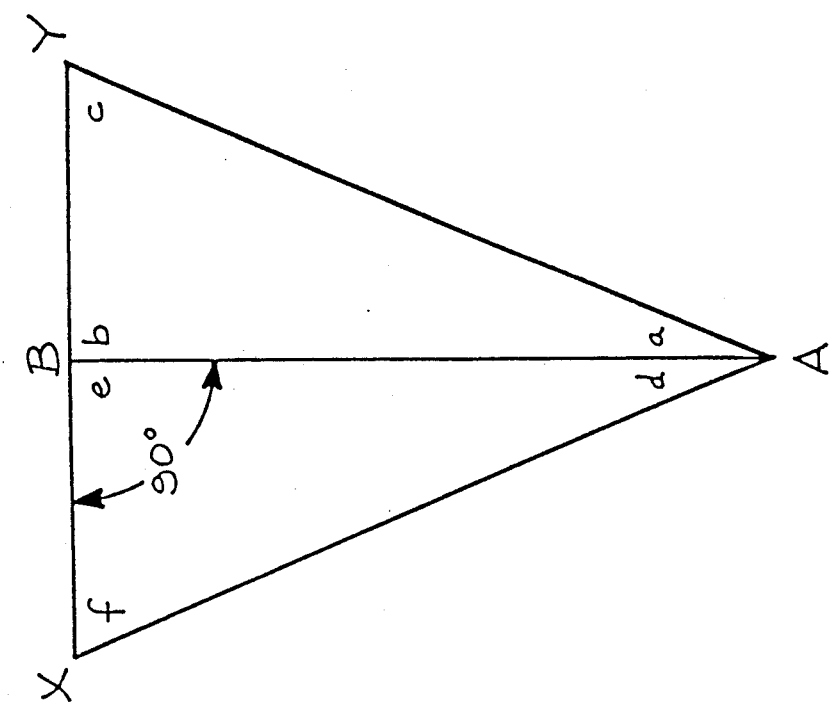
FIG. 26 is a diagram used for the purpose of illustrating a preferred method of calculation.
Figure 25:
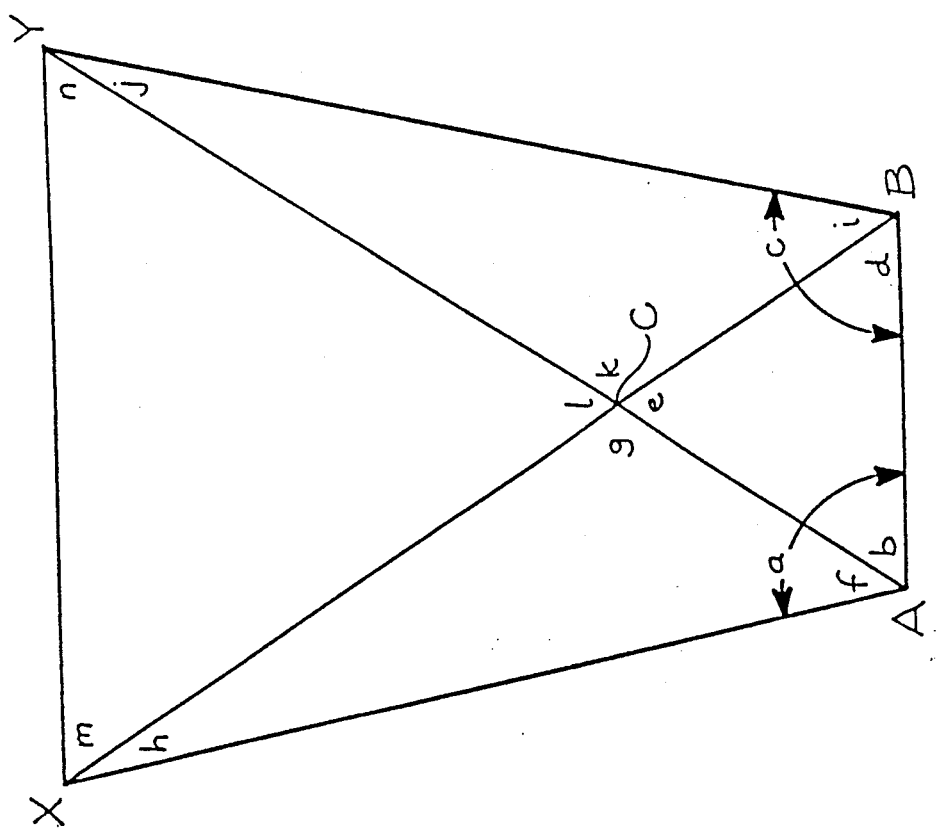
FIG. 25 is a diagram used for the purpose of illustrating one method of calculation.

By way of background, every manufacturer of vehicles publishes specifications for use by persons performing vehicular repair. These specifications are compiled by businesses such as KLM Automotive Publishing Inc. FIG. 25 and 26. The specifications contain detailed horizontal measurements from points on the vehicular frame designated as coordinate points. The specifications also contain detailed vertical measurements taken from an imaginary horizontal reference line which runs longitudinally of the vehicle. This reference line is known as a datum line. The description of the preferred method which follows will relate the steps of the method to the coordinate point and datum line measurements which are well known to persons skilled in the art.

The scientific principle which underlies the method which will be described is triangulation; a principle long applied in the fields of surveying and navigation. The applicant started experimenting with triangulation by establishing two reference points and from those two points dividing up the vehicular frame into a series of connected triangles. This method of triangulation is illustrated in FIGS. 25 and 26. An example of the trigonometric calculations involved with this method of triangulation are set forth in FIGS. 25 and 26 at the end of the disclosure. Through trial and error the applicant discovered if the vehicular frame were divided up into a series of right angle triangle the trigonometric calculations involved were simplified. The preferred method of triangulation is illustrated in FIG. 25 and 26. An example of the trigonometric calculations involved with this preferred method are set forth in FIG. 25 and 26 at the end of the disclosure. Trigonometry deals with the relationship between the sides and angle of triangles, and more particularly right angle triangles. The applicant further discovered that the area of the vehicular frame could be divided into a series of right angle triangles from a single reference point 48. Reference point 48 is positioned at the intersection of a first plane 300 parallel to and spaced from an end of a vehicle and a second plane 400 perpendicular to first plane 300 and equidistant between a majority of pairs of left side and right side coordinate points on a vehicular frame 28. With a few exceptions vehicular frame 28 is symmetrical resulting in each pair of coordinate points being equally spaced from second plane 400. Second plane 400 can only be located in relation to reference points which are symmetrical. From reference point 48 a series of right angle triangles easily be formed. A first side of each triangle is second plane 400, a second side is an imaginary line extending between pairs of left side and right side coordinate points, and the third side is an imaginary line drawn from reference point 48 to a coordinate point. The properties of triangles, and more particularly right angle triangles, are well known thereby permitting calculations to be accurately made. The sum of the three angles of a triangle will always be 180 degrees. Pythagoras theorem establishes the relation between the sides of a right angle triangle as being $a2+b2=c2$. The trigonometric functions of an acute angle of a right angle triangle are established as sine, cosine, tangent, cotangent, to mention the most frequently used ones. If the sides of the triangle are identified as a, b and c; sin theta=a/c; cos theta=b/c; tan theta=a/b and cotan theta=b/a. This is illustrated in simplified form in FIGS. 25 and 26.

In order for the calculations to be made a number of problems must be resolved. One problem is that of determining the point of intersection of planes 300 and 400. The applicant has developed a method of determining this point of intersection which will be hereinafter described. Another problem is that the coordinate points on a vehicular frame 28 are all at different heights making accurate measurement difficult. To resolve this problem measurements are taken along a datum plane 500 which is coterminous with the datum line provided in the manufacturer's specifications or, if preferred, on a plane parallel to the datum line. Another problem is that the time required to make the necessary measurements manually is prohibitive. To resolve this problem a laser 34 is used which projects a beam of light 50 along datum plane 500. Beam of light 50 is focused on targets 36 suspended from selected pairs of coordinate points into datum plane 500. Another problem is the time required to make the necessary calculations manually is prohibitive. This problem is resolved through use of a computer 38, which is integrated as part of the described method and apparatus. Another problem is determining the direction of the required frame adjustment. This problem is resolved by graphically displaying the differences between the coordinate points in the manufacturers specifications and existing measurements on a computer screen monitor.

Having described the underlying foundation of the method, the method will now be further described with respect to FIGS. 1 through 10 and 24. For the purpose of the description which follows vehicular frame 28 can be considered to have a left side 40 and a right side 42 as viewed from end 28. To further assist in the explanation which follows we will select the following pairs of coordinate points P, K, I, and E FIG. 25 and 26. For our purposes we will further distinguish coordinate points P, K, I and E as being P1, K1, I1, and E1 if they are positioned on side 40 and as P2, K2, I2, and E2 if they are positioned on side 42 of vehicular frame 28.

The preferred method of measuring a vehicular frame 28 to determine alignment, where coordinate points and datum line measurements provided in the manufacturer's specifications are known, consists of the following described steps. Firstly, securing one end 49 of a target 26 to selected ones of coordinate points P1, P2, K1, K2, I1, I2, E1, and E2 such that an opposed end 51 of each of targets 36 extends into a datum plane 500 on or parallel to the datum line provided in the manufacturer's specifications. Targets 36 are shown secured to vehicular frame 28 in FIGS. 1 through 10. Secondly, establishing a reference point 48 at the intersection of a first plane 300 parallel to and spaced from an end 29 of vehicular frame 28 and a second plane 400 perpendicular to first plane 300 and equidistant between coordinate points P1, K1, I1, and E1 on left side 40 and coordinate points P2, K2, I2, and E2 on right side 42 of vehicular frame 28. Reference point 48 is established by selecting a pair of coordinate points (for example P1 and P2) which appear to be undamaged. One of the coordinate points (P1) being on left side 40 of vehicular frame 28 and the other of the coordinate points (P2) being on right side 42 of vehicular frame 28. Coordinate points P1 and P2 are an equal distance from first plane 300. A laser 34 is then positioned at a proposed reference point (not shown) on first plane 300 and a beam of light 50 is projected along datum plane 500 such that beam of light 50 strikes first one and then the other of targets 36 secured to selected coordinate points P1 and P2. The angle from the proposed reference point (not shown) to selected left side coordinate point P1 is then measured in relation to a reference plane (not shown) perpendicular to first plane 300. The angle from the proposed reference point (not shown) to selected right side coordinate point P2 is then measured in relation to a reference plane (not shown) perpendicular to first plane 300. The proposed reference point (not shown) is then shifted along first plane 300 until the angles from the proposed reference point to coordinate points P1 and P2 are identical. Once laser 34 is positioned at reference point 48 the distance from reference point 48 to end 29 of vehicular frame 28 must be determined. This may be done through manual measurement, however, it can be done faster and more accurately by computer 38. For the purpose of these calculations we will use millimeters as the unit of measurement. Determination the angular measurement from reference point 48 to coordinate points P1 and P2 was identical during the set up procedure computer 38 received data regarding the angles. Second plane 400 may be used as a reference plane for the purpose of measurement and considered to be at 0 degrees. The angles to P1 and P2 are of course equal, so we need only perform our calculations on one of the triangles formed. The sides of the triangle area: firstly, an imaginary line along second plane 400; secondly, an imaginary line between coordinate plane P1 and second plane 400; and thirdly, an imaginary line between reference point 48 and coordinate point P1. The imaginary line between second plane 400 and point P1 serves as a reference line as it has a known value of 16 15/16 inches (430.21 mm) according to FIG. 25 and 26 Manufacturers Specifications. Assume that the angular measurement between reference point 48 to coordinate point P1 is 50 degrees and 10 minutes. The three angles of the right angle triangle formed are 90 degrees, 50 degrees and 10 minutes and 39 degrees and 50 minutes, respectively. This is known because the sum of the three angles must be 180 degrees. Knowing the length of the one side, and the angles of the right angle triangle permits us to calculate the distance reference point 48 is from end 29 of vehicular frame 28. The applicable formula is tan theta=a/b. Theta is 39 degrees and 50 minutes. b we know to be 430.21 mm $a=b\times \tan$ 39 degrees 50 minutes. $a=430.21\times 0.8342$; a=358.88. According to Manufacturers Specifications FIG. 25 and 26, coordinate point P1 is positioned 2 ⅛ inches (53.89 mm.) in from end 29. This being the case the distance from reference point 48 to end 29 is 358.88−53.98=304.90 mm or 12 inches. Thirdly, positioning laser 34 at reference point 48 and projecting beam of light 50 along datum plane 500 such that beam of light 50 strikes target 36 secured to a coordinate point (E1) which it is believed has been damaged. The angle is measured from reference point 48 to coordinate point E1 in relation to second plane 400. This forms a triangle the three sides of which consist of: firstly, an imaginary line extending from reference point 48 along a portion of second plane 400 to an imaginary line extending between coordinate points E1 and E2; secondly, an imaginary line extending from coordinate point E1 at a right angles to second plane 400, and an imaginary line from reference point 48 to coordinate point E1. The length of the side of this triangle extending along a portion of second plane 400 is a known value; that being 5983.88 mm. It has already been determined that out set up distance from end 29 of vehicular frame 28 is 12 inches (304.90 mm.). FIG. 25 and 26 Manufacturers Specifications provide a value for the distance from end 29 to an imaginary line running between the pair of coordinate points E1 and E2; that value being 223 9/16 inches (5679.08 mm). The length of 5983.88 is derived by adding together the two values of 304.90 mm and 5679.08 mm. It should be noted that the imaginary line of second plane 400 and the imaginary line extending between where coordinate points E1 and E2 should be cannot be damaged or altered in an accident as they are only notional positions for the purpose of measurement. Fourthly, using the known length of the reference line (in this case along second plane 400), and the angular measurement from reference point 48 to coordinate point E1 to as a basis for trigonometric calculation. The calculation are, of course performed by computer 38 which is programmed to receive and record data regarding the angular adjustment of laser 34, perform trigometric calculations. If coordinate point E1 were undamaged, in the example given, the angle to coordinate point E1 as measured from reference point 48 should be 4 degrees and 16 minutes. This can be verified by application of the formula tan theta=a/b. Our reference line of 5983.88 mm. can be inserted as the value for b in the formula. Tan theta in this instance is 4 degrees and 16 minutes. Tan 4 degrees 16 minutes-=a/5983.88 mm; a=tan 4 degrees 16 minutes×5983.88; a=0.0749×5983.88; a=448.19. FIG. 25 and 26 Manufacturers Specifications indicate this value to be 448. It should be noted that the measurement of an undamaged coordinate point will not always be exact as manufacturers usually specify that a variation of as much as 3 mm. over the length of vehicular frame 28 is acceptable. Our calculations are within acceptable tolerances and conform with that specified in FIG. 25 and 26. If coordinate point E1 were damaged such that the angular measurement from reference point 48 were only 3 degrees and 30 minutes (a variation of 46 minutes), computer 38 would calculate the sides of the resulting triangle. This difference in angular measurement increases the distance between reference point 48 and coordinate point E1 by 10.41 mm. It similarly decreases the distance between coordinate point E1 and second plane 400 by 81.47 mm. Computer 38 can graphically display an image of the existing position of the triangle formed superimposed upon the triangle which would be performed if coordinate point E1 were correctly positioned. Computer 38 can also perform calculations and graphically display a vector arrow showing the direction of the force which must be exerted to straighten vehicular frame 28. It should be noted that, although the above calculations were made as if reference point 48 were 12 inches from end 29, the set up distance is not critical. The set up distance is chosen on the basis of the ability of beam of light 50 from laser 34 to strike all of targets 36 from reference point 48 and the need for reference point 48 to be spaced from any frame straightening equipment. The applicant prefers a that reference point 48 be positioned approximately 3 feet from end 29 of vehicular frame 28.

Figure 11:
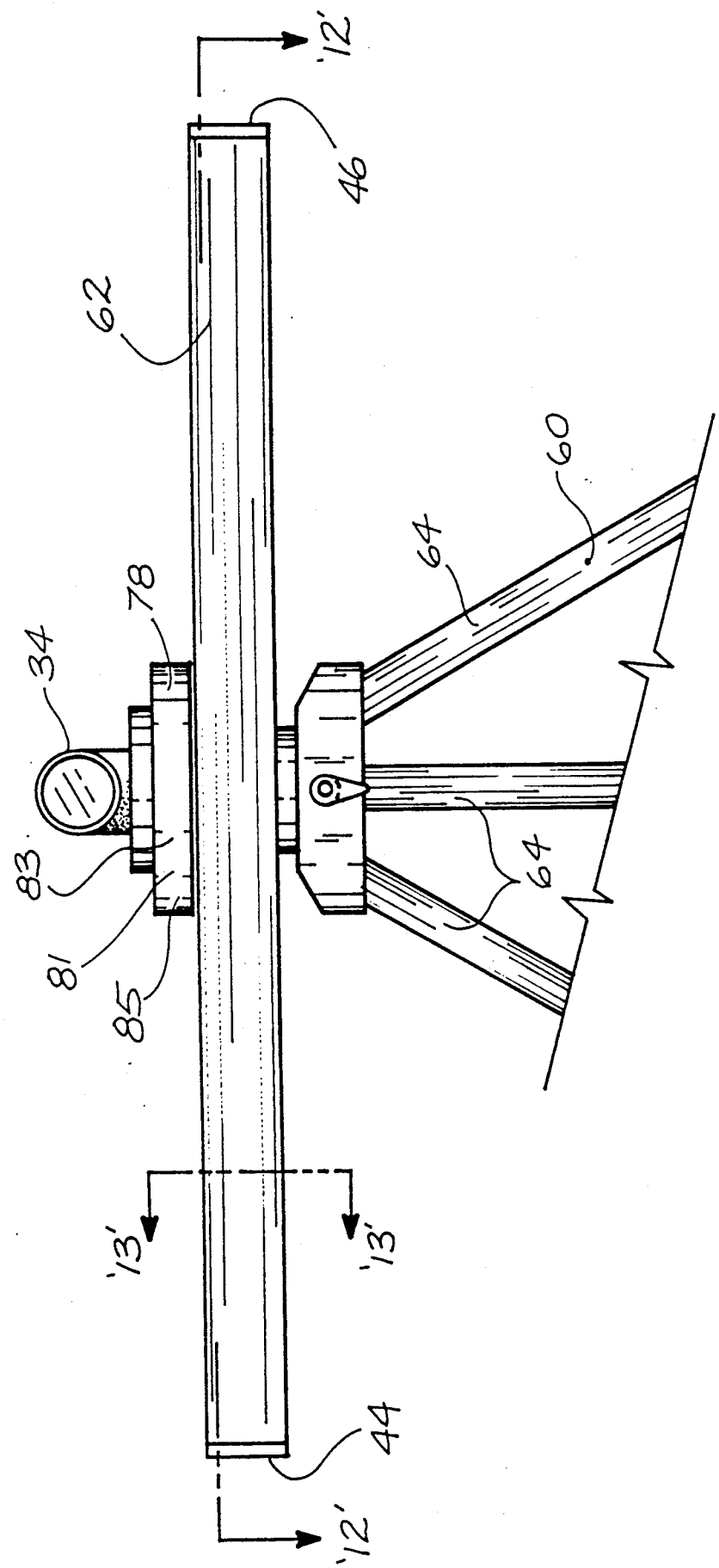
FIG. 11 is a front elevation view of a preferred embodiment of the invention.
Figure 12:
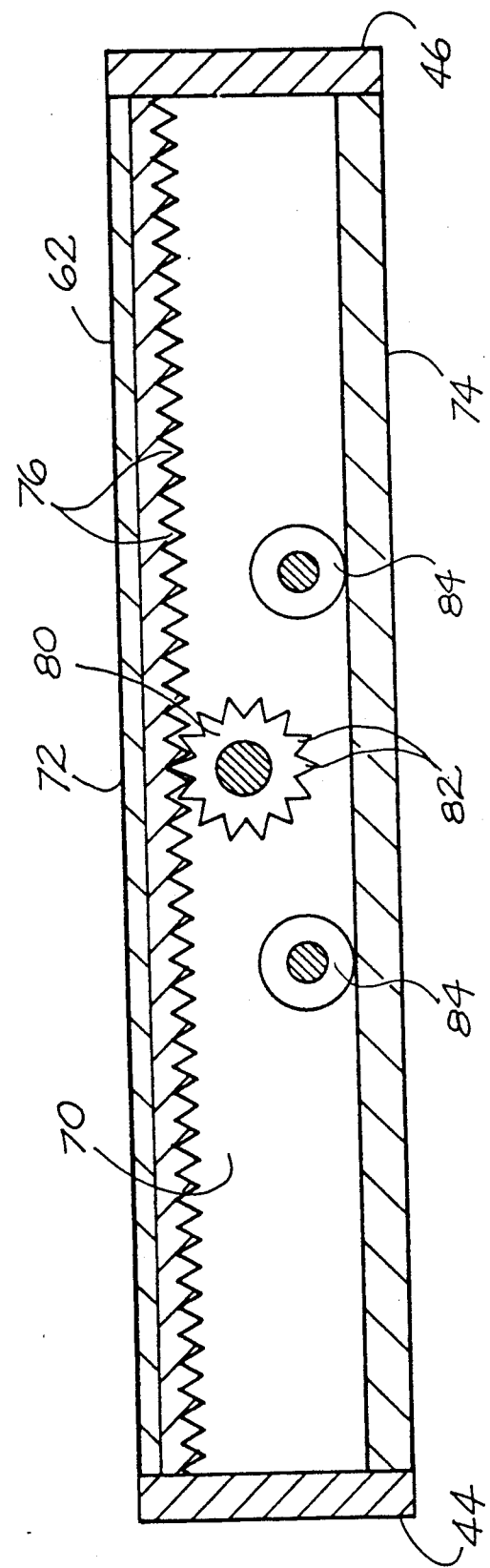
FIG. 12 is a longitudinal section view taken along section lines 12—12 of FIG. 11.
Figure 13:
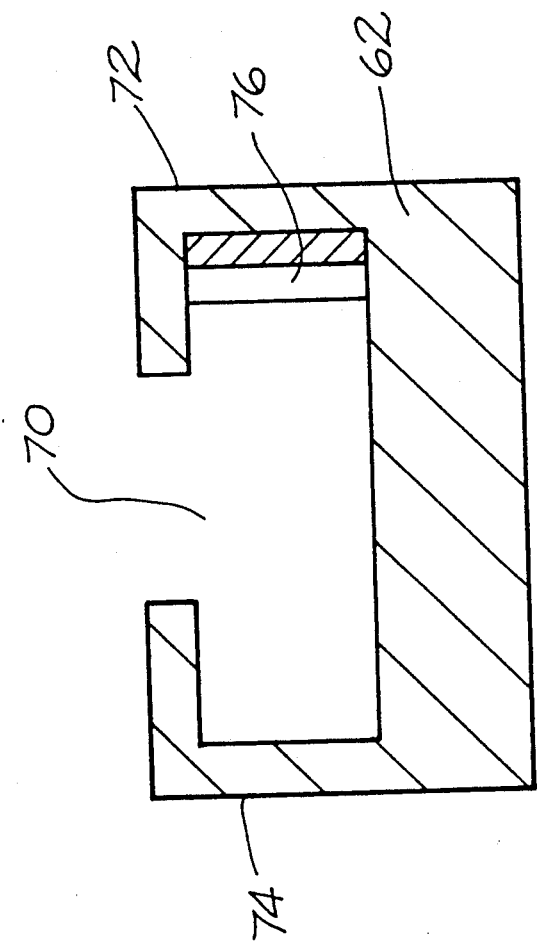
FIG. 13 is a cross-section view taken along section lines 13—13 of FIG. 11.
Figure 14:
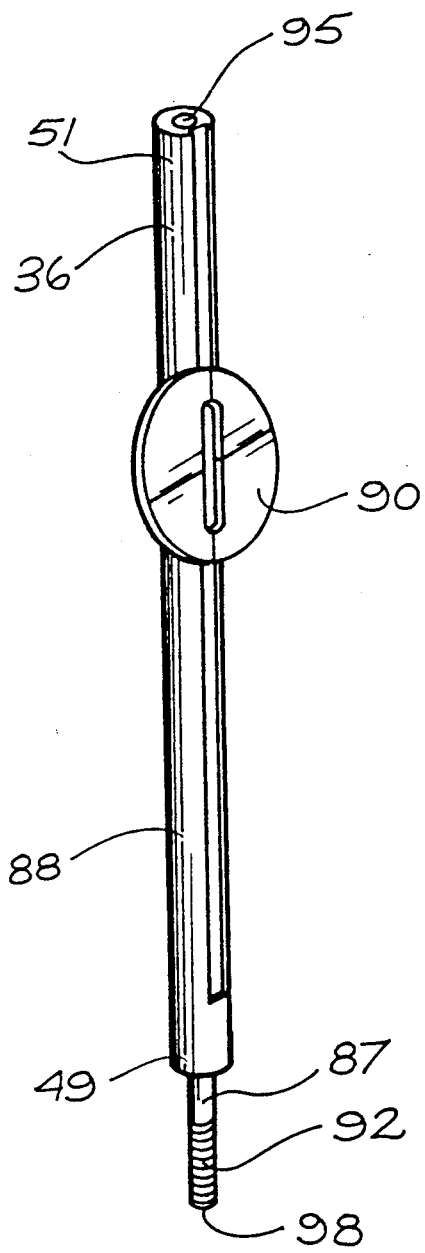
FIG. 14 is a perspective view of a form of upper body target used with the preferred embodiment of the invention.
Figure 15:
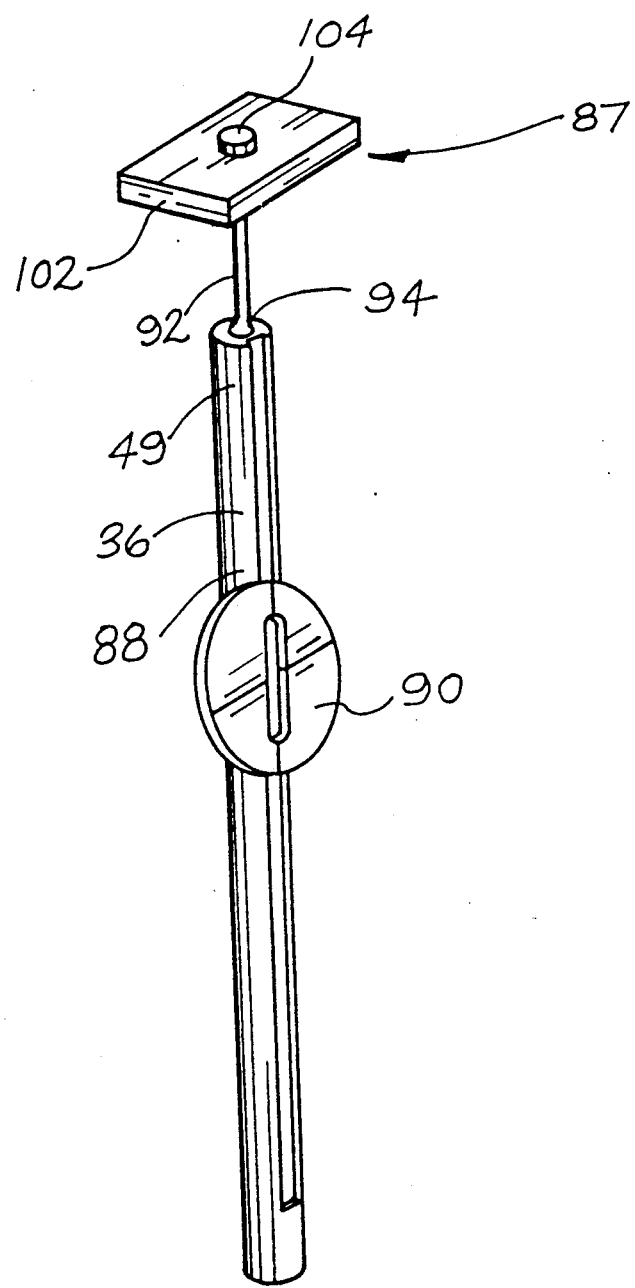
FIG. 15 is a perspective view of a form of lower body target used with the preferred embodiment of the invention.
Figure 17:
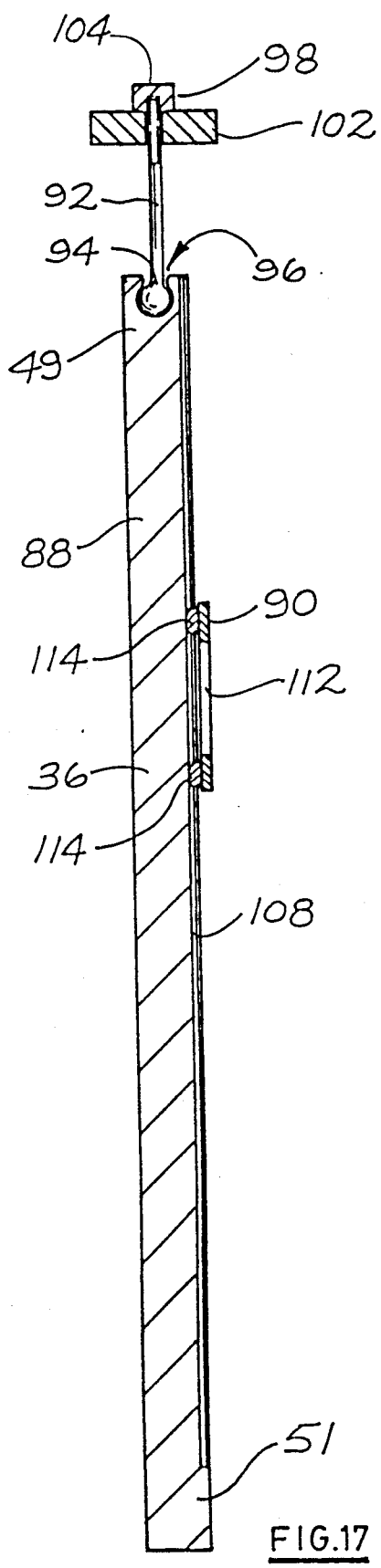
FIG. 17 is a section view of the form of lower body target taken along section lines 17—17 of FIG. 16.
Figure 16:
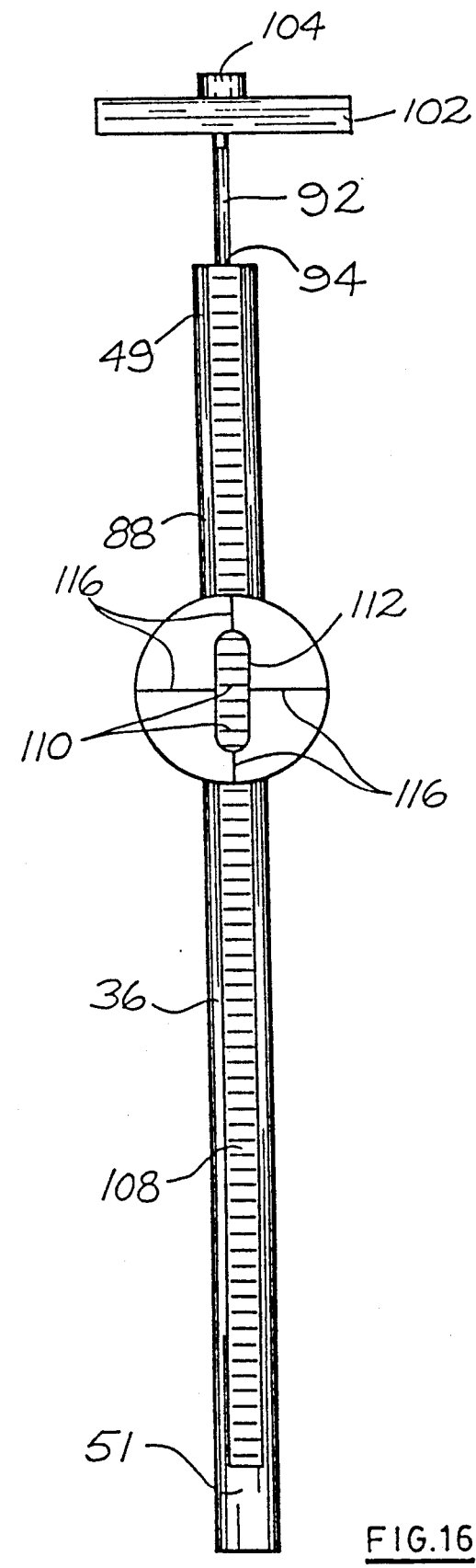
FIG. 16 is a front elevation view of a form of lower body target used with the preferred embodiment of the invention.
Figure 20:
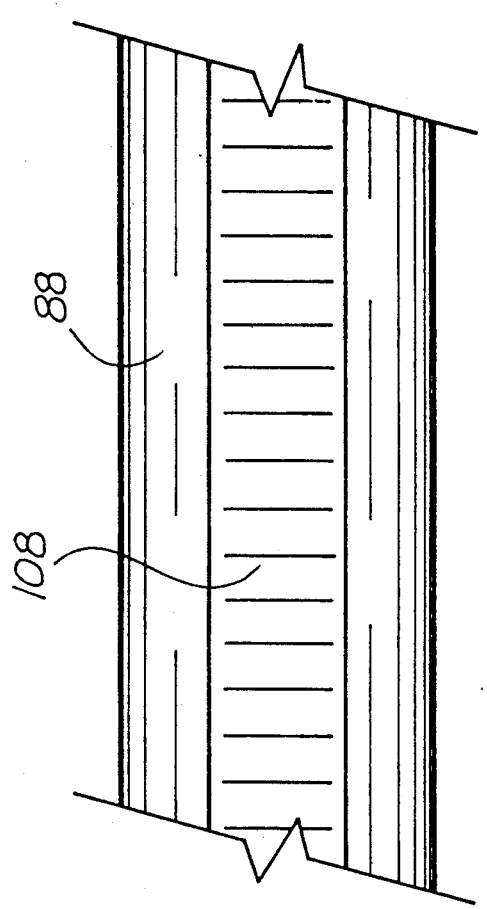
FIG. 20 is a detail view of a second portion of the targets illustrated in FIG. 14 and FIG. 16.
Figure 21:
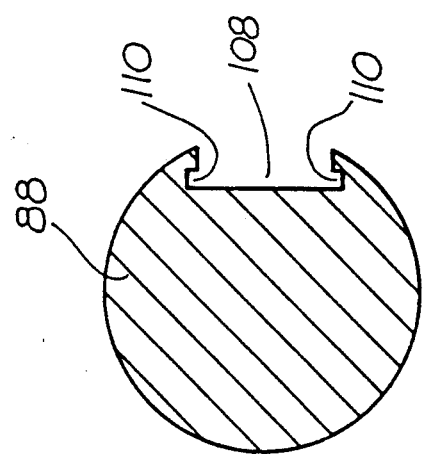
FIG. 21 is a section view of the target taken along section line 21—21 of FIG. 20.
Figure 22:
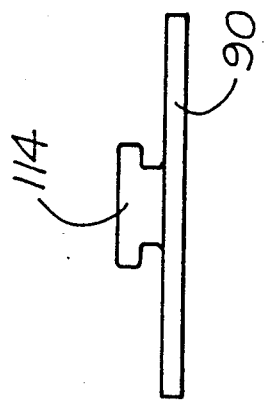
FIG. 22 is a top plan view of a third portion of the targets illustrated in FIG. 14 and FIG. 16.
Figure 24:
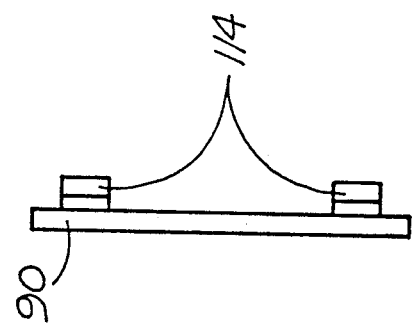
FIG. 24 is a side elevation view of a third portion of the targets illustrated in FIG. 14 and FIG. 16.
Figure 23:
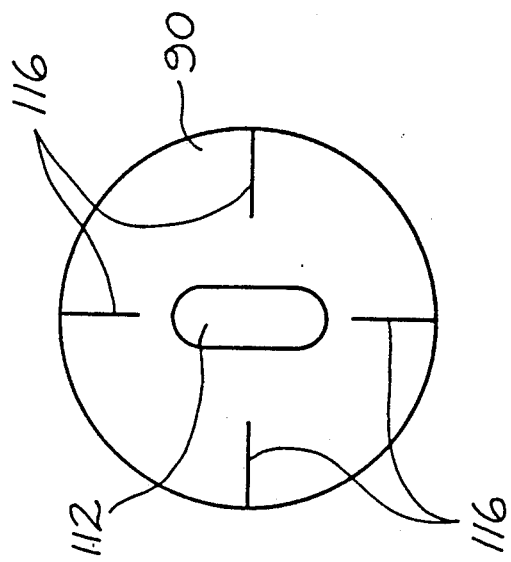
FIG. 23 is a front elevation view of a third portion of the targets illustrated in FIG. 14 and FIG. 16.

The primary components of measuring device 200 consist of a tripod support 60, mounting beam 62, laser 34, targets 36, and computer 38. With reference to FIG. 11, Tripod 60 supports mounting beam 62 in a substantially horizontal orientation. Tripod 60 has legs 64 which are capable of telescopic extension. Mounting beam 62 has a first end 44, and a second end 46. A longitudinal track in the form of a cavity 70 extends between first end 44 and second end 46. With reference to FIGS. 12 and 13, cavity 70 has parallel side walls 72 and 74. Side wall 72 has a plurality of teeth 76. Laser 34 is positioned on a housing 78 which contains a step motor 81, a rotary encoder 83, and an electric motor 85. A step motor is an electromagnetic, rotary, incremental actuator which mechanically converts digital pulse inputs to analog shaft rotation. Such motors are commercially available from suppliers such as Rapidsyn in Oceanside, California. A rotary encoder is a device used to measure rotation of a shaft, its operation is the antithesis to that of a step motor. A rotary encoder generates pulses of electricity in proportion to the amount of shaft rotation. This permits an electrical signal in the form of a stream of pulses to be delivered to a pulse counter portal in computer 38. Step motor 81 may be activated by a control device (not shown) to pivot laser 34 in relation to mounting beam 62 such that the angular positioning of laser 34 on a horizontal plane may be adjusted. A remote control device used for changing channels on a television can be adapted for use to activate step motor 81 or as an alternative step motor 81 can be controlled by a repairman standing at computer 38. Electric motor 85 may be activated to propel laser 34 between first end 44 and second end 46 of mounting beam 62. Electric motor 85 has a gear 80 with a plurality of teeth 82 which extends into cavity 70. Teeth 82 of gear 80 mesh with teeth 76 on side wall 72. In order to provide greater stability two wheels 84 also extend from motor 78 into cavity 70. Wheels 84 engage side wall 74 as laser 34 moves between first end 44 and second end 46 of mounting beam 62. Computer 38 is coupled by a cable 86 to laser 34. As was stated in relation to the method, computer 38 is preprogrammed in a novel manner to perform the necessary calculations with sufficient speed to make the method viable in a commercial application. As is apparent from FIGS. 1 through 10, targets 36 are essential to the successful operation of the invention. The features of targets 36 are illustrated in FIGS. 14 through 24. Targets 36 differ in construction depending upon whether they are intended to be secured to the upper portion or lower portion of vehicular body 28. An upper body target is illustrated in FIG. 14. A lower body target is illustrated in FIG. 15. Each of targets 36 has three portions. A first portion consists of an attachment assembly 87, by means of which target 36 is secured to vehicular body 28. Attachment assembly 87 is illustrated in FIGS. 18 and 19. A second portion consists of a shaft 88, illustrated in FIGS. 20 and 21. A third portion consists of a slidably mounted plate 90, illustrated in FIGS. 22 through 24. Referring to FIG. 18, the attachment assembly 87 used for upper body targets 36 is illustrated. Attachment assembly 87 consists of a threaded rod 92 on which one end 94 is in the form of a ball. End 94 of threaded rod 92 is accommodated in a close fitting socket 96 in shaft 88 at end 49 of target 36. Threaded rod 92 has an opposed end 98 which is adapted to be threaded into mounting brackets 100 on vehicular body 28. At end 51 of shaft 88 upper body targets 36 have a level indicator 95. Referring to FIGS. 17 and 19, the attachment assembly 87 used for lower body targets 36 is illustrated. Attachment assembly 87 consists of a threaded rod 92 on which one end 94 is in the form of a ball. End 94 of threaded rod 92 is accommodated in a close fitting socket 96 in shaft 88 at end 49 of target 36. Threaded rod 92 has an opposed end 98 which is secured to a magnetic plate 102, which is adapted to magnetically adhere to the lower portion of vehicular body 28. Secured to magnetic plate 102 is a magnetic centering plug 104. Plug 104 is intended to be inserted into an opening 106 in vehicular body 28 and be pressed against a leading edge 108 of opening 106. The "leading edge" of opening 106 is the edge facing end 29 of vehicular frame 28 where tripod support 60 is positioned. Referring to FIGS. 20 and 21, shaft 88 has a track 108. Positioned within track 108 are indicia 110. Referring to FIGS. 22 through 24, plate 90 has a slotted opening 112 and two "T" shaped projecting tongues 114. Cross hairs 116 are positioned on plate 90 adjacent slotted opening 112. Referring to FIGS. 16 and 17, projecting tongues 114 on plate 90 are accommodated in track 108 to secure plate 90 to shaft 88, such that plate 90 slides up and down track 108 of shaft 88. Indicia 110 on shaft 88 are visible through slotted opening 112 of plate 90. Cross hairs 116 provide a means for visually aligning plate 90 with indicia 110 on shaft 88.

The use of apparatus 200 will now be described. The repairman secures one end 49 of each of targets 36 to coordinate points P1, P2, K1, K2, I1, I2, E1, and E2 and moves plate 90 along track 108 of shaft 88 until the indicia 110 which is visible through slotted opening 112 and set off by cross hairs 116 corresponds with the datum line position FIG. 25 and 25. It is important that the positioning of plate 90 correspond with the leading edge position of coordinate points P1, P2, K1, K2, I1, I2, E1, and E2, as inconsistency in positioning of targets 36 will distort all measurements by a fraction of an inch. It is important that each of targets 36 be vertically aligned. With the lower body targets this vertical alignment is accomplished by gravity as the weight of shaft 88 tends to cause end 94 to shift within socket 96 until a vertical alignment is achieved. With upper body targets 36, indicator 95 is used to vertically align shaft 88. If shaft 88 is not vertically aligned upper body target 36 can be manipulated into a vertically aligned position by pivoting end 94 within socket 96. Legs 64 of tripod 60 are adjusted to ensure that beam of light 50 of laser 34 projects along datum plane 500 at datum line height, FIG. 25 and 26. Beam of light 50 should strike each of targets 36 where indicia 110 on shaft 88 are visible through slotted opening 112 of plate 90. Tripod 60 is positioned along plane 300 spaced from and parallel to vehicular frame 28. It must be appreciated that from a visual inspection the repairman will have an indication which of coordinate points P1, P2, K1, K2, I1, I2, E1, and E2 may have been moved out of alignment as a result of the accident. He will preferably set up apparatus 200 at and end 29 of vehicular frame 28 which is clearly undamaged. By starting at undamaged end 29 the repairman can have some assurance that coordinate points P1 and P2 at undamaged end 29 are correctly aligned. In positioning tripod 60 the repairman tries to place mounting bar 62 as close as humanly possible to a position where first end 44 and second end 46 are equidistant from second plane 28. Step motor 81 is then activated to cause laser 34 to rotate until beam of light 50 projected along datum plane 500 strikes target 36 secured to selected left side coordinate point P1. The degree of rotation of laser 34 is then translated into an electrical signal by rotary encoder 83. The signal is sent via coaxial cable 86 to a pulse counter portal in computer 38, and the electrical signal is translated into a record of the angular positioning of laser 34 in relation to a reference plane (not shown) perpendicular to first plane 300, in the same manner as if the reference plane were second plane 400. Step motor 81 is then activated to cause laser 34 to rotate until beam of light 50 projected along datum plane 500 strikes target 36 secured to selected right side coordinate point P2. The degree of rotation of laser 34 is then translated into an electrical signal by rotary encoder 83. The signal is sent via coaxial cable 86 to a pulse counter portal in computer 38, and the electrical signal is translated into a record of the angular positioning of laser 34 in relation to a reference plane (not shown) perpendicular to first plane 29, in the same manner as if the reference plane were second plane 28. If the angular measurements recorded by computer 38 are not identical, motor 85 is activated to rotate gear 80. Upon the rotation of gear 80, teeth 82 mesh with teeth 76 on side wall 72 to cause laser 34 to move along the longitudinal track formed by cavity 78. The process of angular measurement described is then repeated until the angles from laser 34 to P1 and P2 are identical. At this stage no trigonometric calculations need be made, as the repairman is merely positioning laser 34 at point 48 where first plane 300 intersects second plane 400. As a check on apparatus 25 the repairman would then have computer 38 perform the trigonometric calculations on P1 and P2 as was previously described. It will be noted that the degree of movement of laser 34 will always be less than 180 degrees. The repairman then activates step motor 81 to have laser 34 project a beam of light along datum plane 500 onto targets 36 which are secured to each of coordinate points P1, P2, K1, K2, I1, I2, E1, and E2 in turn. At each target the degree of rotation of laser 34 is then translated into an electrical signal by rotary encoder 83. The signal is sent via coaxial cable 86 to a pulse counter portal in computer 38, and the electrical signal is translated into a record of the angular positioning of laser 34 in relation to second plane 400. As each target 36 is hit by beam of light 50 computer 38 performs trigonometric calculations with respect to the triangle formed and graphically displays the results to indicate to the repairman whether the coordinate point is positioned within acceptable tolerances. The capacity of computer 38 and the accuracy of laser 34 can be made such that the measurements of each one of selected coordinate points P1, P2, K1, K2, I1, I2, E1, and E2 can be performed in a single sweep of datum plane 500.

It will be apparent to one skilled in the art that, with the exception of targets 36, apparatus 200 is removed from and in no way impinges upon the working area of the repairman. If one of targets 36 is temporarily in the way when effecting repairs, it can easily be removed and then put back into position without having to readjust apparatus 200. By taking measurements from single reference point 48 it should be possible to shoot all targets in a single sweep of laser 34. It will also be apparent to one skilled in the art that, the constant remeasurements which is required during the course of adjustment of vehicular frame 28 is easily facilitated by having a beam of light 50 from laser 34 sweep datum plane 500 and strike targets 36. The sweep of datum plane 500 would take a matter of seconds as compared to the time consuming process of remeasuring required with other systems. It will also be apparent that the described method and apparatus can be used for repairing the lower portion of vehicular frame 22 as illustrated in FIGS. 1 through 4 and 9; or the upper portion as illustrated in FIG. 5 through 8 and 10. It will also be apparent to one skilled in the art that the size and weight of apparatus 200, is a significant improvement over every system of measurement presently known.

The calculations required will be apparent to one skilled in the art. However, for convenience and clarity, examples of calculations will now be provided:

Calculation Using Normal Triangulation

The calculations which follow are with reference to the lines and angles illustrated in FIG. 25. The calculations are not the only manner of solving the problem, but merely are to illustrate one way in which the problem may be solved. In solving the problem we will primarily rely upon two formulas. The first is that in any triangle the sum of the three angles will always equal 180 degrees. The second is that, if we assign the letters A, B, and C for the sides of a triangle and the letters a, b, and c to the angles of a triangle there is a relationship which can be expressed as $A/\sin a = B/\sin b = C/\sin c$.

Referring now to FIG. 25, we being with a line A-B which we know to be 40 mm and we want to ascertain the length of line X-Y. It must be noted that line A-B need not be parallel to line X-Y. We then draw a series of lines and measure the angles of these lines in relation to line A-B. A-X creating angle a at 101 degrees A-Y creating angle b at 52 degrees B-X creating angle c at 117 degrees B-Y creating angle d at 65 degrees By drawing these lines we have created triangles A-X-Y and B-X-Y. In addition, lines A-Y and B-X cross at points C creating triangles A-B-C, A-X-C, B-Y-C, and X-Y-C. The resulting angles will be assigned number as we proceed.

Triangle A-B-C is composed of angles b, d and e. Angles b and d have been measure and determined to be 52 degrees and 65 degrees, respectively. $b+d+e=180$ degrees. Therefore, $e=180-(b+d)$; $e=180-117$; $e=63$ degrees. $A-B/\sin e = A-C/\sin d = B-C/\sin b$; $40/\sin 63 = A-C/\sin 65 = B-C/\sin 52$; $40/0.0891 = A-C/0.0906 = B-C/0.0788$; $40/0.0891 = 40.67/0.0906 = 35.38/0.0891$. $A-C = 40.657$. $B-C = 35.38$.

Triangle A-X-C is composed of angles f, h, and i. None of these angles are known, however we do know that angles $b+f=a$; $f=a-b$; $f=101-52$; $f=49$ degrees. We also know that angles $a+d+h=180$ degrees; $h=180-(d+a)$; $h=180-(65+101)$; $h=14$ degrees. Having derived values for f and h we are in a position to apply our formula, $f+h+g=180$ degrees; $g=180-(f+h)$; $g=180-(49+14)$; $g=117$ degrees. $A-X/\sin g = A-C/\sin h = X-C/\sin f$; $40.67/\sin 14 = A-X/\sin 117 = X-C/\sin 49$; $40.67/0.0242 = A-X/0.0891 = X-C/0.0755$; $40.67/0.0242 = 149.74/0.0891 = 126.88/0.0755$. $A-X = 149.74$. $X-C = 126.88$.

Triangle B-Y-C is composed of angles i, j, and k. None of these angles are known, however we do know that angles $d+i=c$; $i=c-d$; $i=117-65$; $i=52$ degrees. We also know that angles $b+c+j=180$ degrees; $j=180-(b+c)$; $j=180-(52+117)$; $j=11$ degrees. Having derived values for i and j we are in a position to apply our formula, $i+j+k=180$ degrees; $k=180-(i+j)$; $k=180-(52+11)$; $i=117$ degrees. $Y-C/\sin i = B-C/\sin j = B-Y/\sin k$; $Y-C/\sin 52 = B-C/\sin 11 B-Y/\sin 117$; $Y-C/0.0788 = 35.38/0.0191 = B-Y/0.0891$; $145.97/0.0788 = 35.38/0.0191 = 165.04/0.0891$. $Y-C = 145.97$. $B-Y = 165.04$.

Triangle X-Y-C is composed of angles l, m and n. One of those angles is easy to ascertain as angles e, g, k, and l cumulatively total 360 degrees. $l = 360 - (e+b+d+e=g+k)$; $l = 360-(63+117+117)$; $l=63$. The lengths of sides X-C and Y-C has been determined in relation to the other triangles. In performing our calculations with respect to triangle A-X-C we determined that line X-C was 126.88 mm. In performing our calculations with respect to triangle B-Y-C we determined that line Y-C was 145.97 mm. In order to complete our calculations we must use the law of cosines. $X-Y2 = X-C2 + Y-C2 - 2(X-C+Y-C) \cos l$; $X-Y2 = 126.88$ mm $2 + 145.97$ mm $2 - 2(126.88+145.97) \cos 63$ degrees; $X-Y2 = 16098.53 + 21307.24(545.70 \times 0.4540)$ $X-Y2 = 37158.02$; $X-Y = 192.76$.

Calculations Using Preferred Method of Triangulation

The calculations which follow are with reference to the lines and angles illustrated in FIG. 26. These calculations are in accordance with a preferred method. In order to simplify the trigonometric calculations required, the triangle formed must be a right angle triangle, the length of one side of the triangle must be known or ascertainable, and one the acute angles must be known.

Referring to FIG. 26, we start with a line X-Y which we wish to measure. We establish a second line A-B which meets line X-Y at 90 degrees. Line X-B need not be equal in length to line Y-B. We must known as a given factor the length of line A-B, for the purpose of our example we will assume a length of 1000 mm. We then establish a lines A-Y and A-X and measure the angles. For the purpose of our examples we will assume the angles were 25 degrees and 35 degrees, respectively. Two triangles have been formed A-X-B and A-Y-B. It should be noted that only one triangle need be formed if line A-B bisected line X-Y into two equal portions X-B and Y-B.

Triangle A-Y-B has three angles a, b and c. Angle a has been measured and determined to be 25 degrees. Angle b is known to be 90 degrees. Angle c is unknown but ascertainable. $a+b+c=180$ degrees; $c=180-(a+b)$; $c=180-(25+90)$; $c=65$ degrees. The acute angle in the triangle, known as theta is 25 degrees. Trigonometry establishes that the relationship between the sides and angles of a right angle triangle is Tan theta $= Y-B/A-B$. Tan $25 = Y-B/1000$; $Y-B = \tan 25 \times 1000$; $Y-B = 0.4663 \times 1000$; $Y-B = 466.30$ mm.

Triangle A-X-B has three angles d, e and f. Angle d has been measured and determined to be 35 degrees. Angle e is known to be 90 degrees. Angle f is unknown but ascertainable. $d+e+f=180$ degrees; $f=180-(d+e)$; $f=180-(35+90)$; $f=55$ degrees. The acute angle in the triangle, known as theta is 35 degrees. Trigonometry establishes that the relationship between the sides and angles of a right angle triangle is Tan theta=$X-B/A-B$. Tan 35=$X-B/1000$; $X-B$=tan 35×1000; $X-B$=0.7002×1000; X-B=700.20 mm.

The length of line X-Y is therefore $Y-B+X-B$; 466.30+700.20=1166.50 mm.

It will be apparent to one skilled in the art that modifications may be made from the subject matter described without departing from the spirit and scope of the invention.

The embodiments of the invention in which an exclusive property or privilege is claimed are defined as follows:

1. A method of measuring a vehicular frame to determine alignment, comprising the steps of:
   a. firstly, establishing two reference points spaced from a vehicular frame a known distance apart, thereby providing a scale for measurement;
   b. secondly, establishing a plurality of pairs of left side and right side coordinate point along the length of the vehicular frame;
   c. thirdly, measuring the angle from each reference point to the coordinate points; and
   d. fourthly, using the scale provided by the known distance between the reference points measured angles from the reference points to the coordinate points as a basis for trigonometric calculation of the distances between the coordinate points on the vehicular frame.

2. A method as defined in claim 1, the reference points being positioned on a first plane parallel to one end of the vehicular frame.

3. A method of measuring a vehicular frame to determine alignment, comprising the steps of:
   a. firstly, establishing a single reference point at the intersection of a first plane parallel to and spaced a known distance from a vehicular frame and a second plane perpendicular to the first plane;
   b. secondly, establishing a plurality of pairs of left side and right side coordinate points along the length of the vehicular frame;
   c. thirdly, measuring the angle from the reference point to the coordinate points; and
   d. fourthly, using the scale provided by the known distance from the vehicular frame and the measured angles from the reference point to the coordinate points as a basis for trigonometric calculation of the distances between the coordinate points on the vehicular frame.

4. A method as defined in claim 3, the second plane being equidistant between a majority of pairs of left side and right side coordinate points on the vehicular frame.

5. The method as defined in claim 3, wherein the point of intersection of the first plane and second plane is established by:
   a. Firstly, selecting a pair of coordinate points which appear to be damaged, one of the coordinate points being on the left side of the vehicular frame and the other being on the right side of the vehicular frame, the coordinate points being an equal distance from the first place;
   b. Secondly, measuring the angle in relation to a plane perpendicular to the first plane from the proposed reference point to the selected left side coordinate point;
   c. Thirdly, measuring the angle in relation to a plane perpendicular to the first plane from the proposed reference point to the selected right side coordinate point; and
   d. Fourthly, shifting the proposed reference point along the first plane until the angles from the proposed reference point to the selected left side and right side coordinate points are identical.

6. A method of measuring a vehicular frame to determine alignment, where measurements provided in the manufacturer's specifications are known, comprising the steps of:
   a. firstly, establishing a plurality of pairs of left side and right side coordinate points along the length of a vehicular frame;
   b. secondly, securing a target to each of the coordinate points such that each of the targets extend into a datum plane on or parallel to the datum line provided in the manufacturer's specifications;
   c. thirdly, establishing a single reference point at the intersection of a first plane parallel to and spaced a known distance from an end of a vehicular frame, and a second plane perpendicular to the first plane and equidistant between a majority of pairs of coordinate points on the left side and right side of the vehicular frame by;
      i. selecting a pair of coordinate points which appear to be undamaged, one of the coordinate points being on the left side of the vehicular frame and the other being on the right side of the vehicular frame, the coordinate points being an equal distance from the first plane;
      ii. positioning a laser at a proposed reference point and projecting a beam of light along the datum plane such that the beam of light strikes a target secured to a selected coordinate point;
      iii. measuring the angle from the proposed reference point to the selected left side coordinate point;
      iv. measuring the angle from the proposed reference point to the selected right side coordinate point; and
      v. shifting the proposed reference point along the first plane until the angles from the proposed reference point to the selected left side and right side coordinate points are identical;
   d. fourthly, triangulating the vehicular frame by positioning a laser at the reference point and projecting a beam of light along the datum plane such that the beam of light strikes the targets secured to the coordinate points and measuring the angle in relation to the second plane from the reference point to the selected coordinate points; and
   e. fifthly, using the known distance to the vehicular frame, the distance from the front of the vehicular frame of the coordinate points as provided in the manufacturers specifications, and the angular measurement from the reference point to the coordinate points as a basis for trigonometric calculation of the distances between the coordinate points on the vehicular frame, the calculations being performed by a computer connected to the laser, the computer being programmed to receive and record data regarding the angular adjustment of the laser, perform trigometric calculations and graphically display the correct positioning and the existing positioning of the coordinate points.

7. A measuring device for use in vehicular repair, comprising:

a. a tripod support of a known length, having a first end and a second end, and having extendible legs whereby the height of the support may be adjusted;

b. a laser movable between the first end and second end of the support, and rotatably mounted on the support such that the angular positioning of the laser on a horizontal plane may be adjusted;

c. a rotary encoder for measuring and transmitting data with respect to the angular positioning of the laser; and d. a computer programmed to receive signals from the signal means, and using data regarding the angular adjustment of the laser when focused on targets secured to coordinate points on a vehicle frame from both the first end and the second end of the support, and the scale provided by the known distance between the first end and second end of the support perform trigometric calculations as to the distance between the coordinate points.

8. A method of measuring a vehicular frame to determine alignment, comprising the steps of:

a. firstly, establishing two reference points spaced from a vehicular frame a known distance apart, thereby providing a scale for measurement;

b. secondly, establishing a plurality of pairs of left side and right side coordinate points along the length of the vehicular frame;

c. thirdly, securing a target to each one of the coordinate points, each target having an end extending into a datum plane on or parallel to a datum line as provided in manufacturer's specifications:

d. fourthly, projecting a beam of light from a laser from each reference point along the datum plane such that the beam of light strikes one of the targets and measuring the angle from each reference point to the coordinate points; and e. fifthly, using the scale provided by the known distance between the reference points and the measured angles from the reference points to the coordinate points as a basis for trigonometric calculation of the distances between the coordinate points on the vehicular frame.

9. The method as defined in claim 8, having a computer connected to the laser, the computer being programmed to receive and record data regarding the angular adjustment of the laser and to perform trigonometric calculations.

10. The method as defined in claim 9, the computer being programmed to graphically display the correct positioning and the existing positioning of coordinate points.

11. The method as defined in claim 8, the target comprising:

a. a shaft having a first end and a second end;

b. means at one of the ends of the shaft for securing the shaft to a vehicular frame such that the shaft extends vertically from one of the coordinate points; and c. a member slidably moveable between the first end and the second end of the shaft, such that the member may be positioned in the datum plane.

12. A measuring device for use in vehicular repair, comprising:

a. a support of a known length, having a first end and a second end;

b. a laser movable between the first end and second end of the support, the laser being rotatably mounted on the support such that the angular positioning of the laser on a horizontal plane may be adjusted;

c. a rotary encoder for measuring and transmitting data with respect to the angular positioning of the laser; and d. a computer programmed to receive signals from the signal means, and using data regarding the angular adjustment of the laser when focused on targets secured to coordinate points on a vehicular frame from both the first end and the second end of the support and the scale provided by the known distance between the first end and second end of the support perform trigonometric calculations as to the distances between the coordinate points.

13. A measuring device as defined in claim 12, the support being a tripod.

14. A measuring device as defined in claim 13, the tripod having extendible legs whereby the height of the support may be adjusted.

15. A measuring device as defined in claim 12, having an incremental rotary actuator which converts electrical signal inputs to rotation of the laser.

16. A measuring device as defined in claim 12, the support having a mounting beam with a longitudinal track and the laser having means for engaging the track such that the laser is secured to and movable between the first and second ends of the mounting beam.

17. A measuring device as defined in claim 16, the longitudinal track being a cavity with parallel side walls, at least one of the side walls having a plurality of teeth, the means for engaging the track being a gear with a plurality of teeth which extends into the cavity such that the teeth of the gear mesh with the teeth in the side wall.

18. A measuring device as defined in claim 17, motor drive means being provided to propel the laser between the first and second ends of the mounting beam.

* * * * *